(12) United States Patent
Hirst

(10) Patent No.: US 8,396,607 B2
(45) Date of Patent: *Mar. 12, 2013

(54) GRID RESPONSIVE CONTROL DEVICE

(75) Inventor: David R Hirst, Brighton (GB)

(73) Assignee: ResponsiveLoad Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/927,892

(22) Filed: Nov. 29, 2010

(65) Prior Publication Data

US 2011/0118891 A1 May 19, 2011

Related U.S. Application Data

(63) Continuation of application No. 11/921,362, filed as application No. PCT/EP2006/005252 on Jun. 1, 2006, now abandoned.

(30) Foreign Application Priority Data

Jun. 3, 2005 (GB) .................................. 0511361.8

(51) Int. Cl.
  *G05D 3/12* (2006.01)
  *G05D 5/00* (2006.01)
  *G05D 9/00* (2006.01)
  *G05D 11/00* (2006.01)
  *G05D 17/00* (2006.01)
  *G01R 21/06* (2006.01)
  *G01R 19/00* (2006.01)
  *H02J 3/14* (2006.01)

(52) U.S. Cl. ............... 700/295; 702/61; 702/64; 307/39
(58) Field of Classification Search ............... 700/286, 700/295–298, 291; 702/57, 60–65; 60/643, 60/645, 646; 307/31–35, 38, 39
See application file for complete search history.

(56) References Cited

U.S. PATENT DOCUMENTS

| 4,317,049 | A | 2/1982 | Schweppe | 307/39 |
|---|---|---|---|---|
| 5,424,903 | A | 6/1995 | Schreiber | 361/166 |
| 6,489,834 | B2 * | 12/2002 | Naffziger et al. | 327/534 |
| 6,490,448 | B1 * | 12/2002 | Hogberg et al. | 455/427 |
| 6,633,823 | B2 * | 10/2003 | Bartone et al. | 702/57 |
| 7,464,551 | B2 * | 12/2008 | Althaus et al. | 60/646 |
| 7,830,037 | B2 * | 11/2010 | Hirst | 307/39 |
| 2003/0230935 | A1 | 12/2003 | Radley | 307/64 |

FOREIGN PATENT DOCUMENTS

| DE | 40 20 294 A1 | 1/1992 |
|---|---|---|
| JP | 2002-300725 | 10/2002 |
| WO | WO 94/06191 | 3/1994 |
| WO | WO 97/26696 | 7/1997 |
| WO | WO 2005/029670 A1 | 3/2005 |

* cited by examiner

*Primary Examiner* — Crystal J Barnes-Bullock
(74) *Attorney, Agent, or Firm* — Alix, Yale & Ristas, LLP

(57) ABSTRACT

A control device for controlling an energy consumption of a load on an electricity grid includes a sensor for sensing over a period of time values of a physical variable of the grid, where the physical variable varies in dependence on a relationship between electricity generation and load on the grid. The control device also includes apparatus for varying the energy consumption of said load.

8 Claims, 12 Drawing Sheets

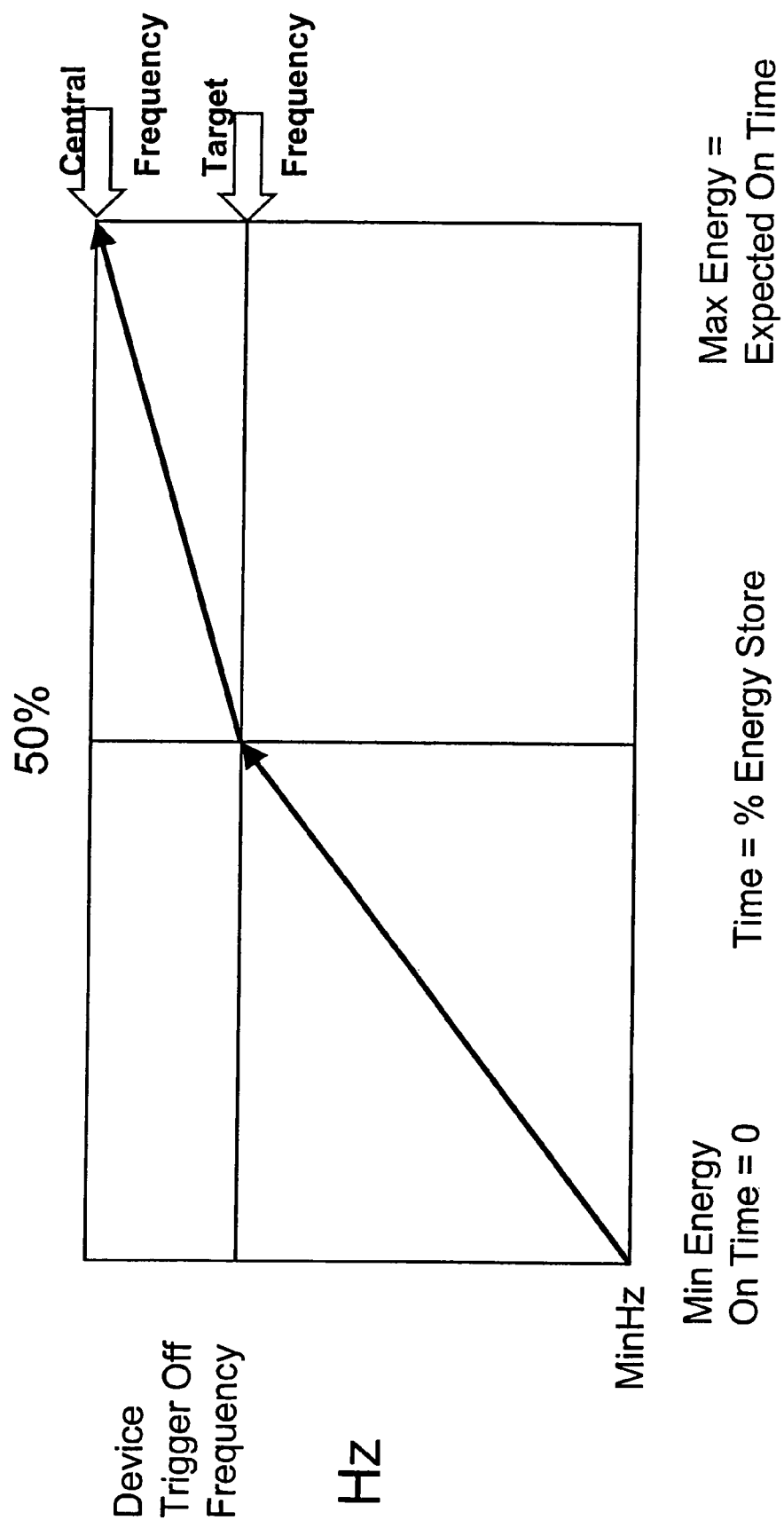

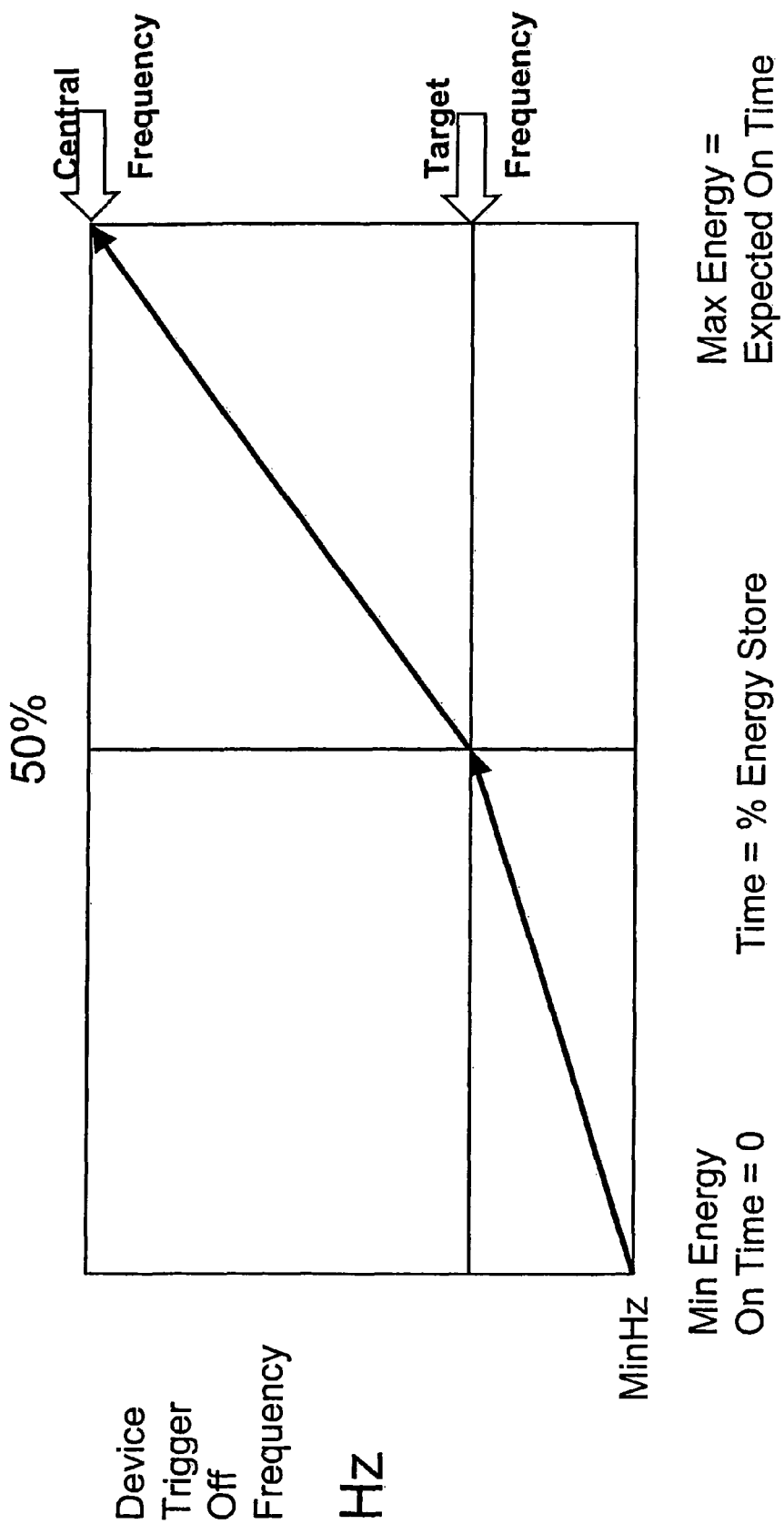

GRID RESPONSIVE CONTROL DEVICE

CROSS-REFERENCE TO RELATED APPLICATIONS

This application is a continuation of U.S. patent application Ser. No. 11/921,362 filed Nov. 30, 2007, now abandoned which is the national stage of International Application No. PCT/EP2006/005252 filed Jun. 1, 2006.

FIELD OF THE INVENTION

The present invention relates to a means and method for controlling the balance between supply and generation on an electricity grid.

BACKGROUND OF THE INVENTION

A reliable source of electricity is essential for almost all aspects of modern life.

Providing reliable electricity is, at present, an enormously complex technical challenge. It involves real-time assessment and control of an electricity system consisting of generation, of all types (nuclear, coal, oil, natural gas, hydro power, geothermal, photovoltaic, etc.), and load e.g. the appliances, instruments etc. using the electricity.

The electricity is supplied over a distribution network consisting of transmission lines interconnected by switching stations. The generated electricity is generally 'stepped-up' by transformers to high voltages (230-765 kV) to reduce transmission losses of electricity (through heating). The generators, distribution networks and loads comprise an electricity power grid.

Reliable operation of a power grid is complex as, at present, electricity must be produced the instant it is used, meaning power generation and demand must be balanced continuously. In existing power management systems, the supply of electricity is balanced to demand by planning, controlling and coordinating the generation of electricity.

Failure to match generation to demand causes the frequency of an AC power system to increase when generation exceeds demand and decrease when generation is less than demand.

In the UK, the electricity boards must maintain a nominal frequency of 50 Hz and are allowed a variation of ±½%. In the US, this nominal frequency is 60 Hz. In some closed loop systems, such as an airplane, the nominal frequency is 400 Hz. The nominal frequency is the frequency of the AC power that a grid was designed for and it is intended to keep this frequency controlled and stable.

Random, small variations in frequency are normal, as loads come on and off and generators modify their output to follow the demand changes. However, large deviations in frequency can cause the rotational speed of generators to move beyond tolerance limits, which can damage generator turbines and other equipment.

The variation in frequency can also damage loads.

A frequency change of just ±½% is a large signal in terms of the precision of modern semiconductor instrumentation.

There are problems with the present supply-side style architecture of matching generation to demand. At present, when extreme low-frequencies can not be dealt with, i.e. demand out-strips generation, automatic under-frequency load shedding may be triggered, which takes blocks of customers off-line in order to prevent a total collapse of the electricity system. This may have the effect of stabilizing the system, but is extremely inconvenient and even hazardous to the user.

After a blackout the grid is at a particularly sensitive stage and recovery is slow. Large generators generally require other generators to make some power available to start or re-start it. If no power is available, such generator(s) cannot start. So grid systems have services, known as "black start" services, whereby a subset of generation has the capacity to start and continue generating, even when the rest of the grid is inactive (i.e. black). Grid operators have prepared planned sequences for restoring generation and load. These ensure that the limited initial supplies are used first to provide communication and control, then to start up bigger generators, and thereafter the load is progressively connected to match the increasing availability of generation.

The entire process of black start is a fraught one. A blackout is a very rare event, and not one that can be practiced except in an actual crisis. Everybody involved is under severe pressure, and the systems are being operated quite outside their normal operating range (and sometimes outside their design range). Every step when load or generation is added is a shock to the system and the grid can take seconds or minutes to stabilize after it happens. Prudence would suggest making changes in small increments. This inevitably slows down the overall process, prolonging the blackout for those who are still to be reconnected.

In order to insure as much as possible against load-shedding, a power system will be operated at all times to be able to cope with the loss of the most important generator or transmission facility (i.e. the most significant single contingency). Thus, the grid is normally being operated well below its capacity such that a large random failure does not jeopardize the system as a whole. This, however, means that the generation is not operating as efficiently as possible, with a resulting increase in electricity supply costs.

High air conditioning and other cooling loads in the summer and high space heating loads in the winter are a normal cause of peak-loads. Grid operators, however, use rigorous planning and operating studies, including long-term assessments, year-ahead, season-ahead, week-ahead, day-ahead, hour-ahead and real time operational contingency analyses to anticipate problems.

The unexpected can still occur, which is why the system operates with headroom for compensating for the largest contingency. Utilities can use additional peaking generators, which have high running cost, to provide additional electricity when needed or, alternatively do not operate main generators at capacity so as to leave some potential for extra generation to satisfy excess loads. Both of these methods result in a higher unit cost of electricity than if the system was operating nearer to capacity.

There has been proposed an alternative architecture for matching load and generation to that presently used. The general idea is to compensate for differences between load and generation using the demand-side by way of load management.

Limited literature exists on the concept of using load, or demand, to contribute (at least) to grid stability.

U.S. Pat. No. 4,317,049 (Schweppe et al.) proposes such a different basic philosophy to existing electric power management in which both supply and demand of electricity respond to each other and try to maintain a state of equilibrium.

This document identifies two classes of usage devices. The first type are energy type usage devices characterized by a need for a certain amount of energy over a period of time in order to fulfil their function and an indifference to the exact time at which the energy is furnished. Examples were space conditioning apparatus, water heaters, refrigerators, air compressors, pumps, etc. The second class was a power type usage device characterized by needing power at a specific time. Such devices would not be able to (fully) fulfil their function if the power was not supplied at a designated time and rate. Examples include lighting, computers, TVs, etc.

The Frequency Adaptive, Power-Energy Re-scheduler (FAPER) of the Schweppe et al. patent provided its power management by application of a FAPER to energy type usage devices. The Schweppe et al. patent particularly discusses application of the FAPER to a water pump for pumping water into a storage tank.

The water level in the water tank has a minimum allowable level Ymin and a maximum allowable level Ymax. Ordinarily, the water pump will be switched on to pump water into the storage tank when the level falls to or below the minimum level and turns the pump off when the maximum level is reached. Otherwise, the pump is idle.

The FAPER modifies these limits (Ymax, Ymin) depending upon the system frequency. Thus, in a period of high frequency (electricity demand shortage), i.e. when the grid frequency increases above nominal, the minimum water level causing the pump to activate (Ymin) is increased and the maximum water level (Ymax)) is also raised. Thus, the pump switches on at a higher level and stops at a higher level than operation not under the control of a FAPER. This means that the excess in generation is being taken up. Using the same principle, as the electricity frequency drops below the grid nominal frequency (a generation shortage), the minimum and maximum water levels are lowered. This lowering results in ON pumps being switched off sooner and OFF pumps coming on later than usual, and so using less electricity, thereby reducing the load.

According to Schweppe, the raising of the limits (particularly the maximum) and the lowering of the limits (particularly the minimum) should have an extent cap, defined by either user desires or safety requirements. Thus, the limits should be extendable, but only to a certain extent, as otherwise the tank could unacceptably empty or overflow.

The broad concept uncovered by Schweppe in this patent is that consuming devices, which incorporate some sort of energy store and operate to a duty cycle, are useful in providing grid responsive behavior. When running, the energy store is being replenished or filled and, thus, the potential energy of the store is increasing. When the devices are not running, their function is preserved because of the load's ability to store energy.

The FAPER modifies the timing of the load's consumption, without detriment to the service provided by the device, using the grid frequency as a guide. Thus, the potential energy of the device is increased when the grid frequency is high in order to maximize the amount of energy fed into the device which is stored. This compensates for any excess. During times of insufficient generation (high frequency), the potential energy of the device is lowered, thereby releasing energy to the grid and compensating for the shortage.

Moving on from the FAPER, a different and improved "responsive load system" was disclosed in GB 2361118 by the present inventor. The responsive load system was based on the same underlying principle as the FAPER devices, that grid stability can be at least aided by using demand-side grid response, and built on the response method and offered a further enhancement of using probabilistic methods as to the ON/OFF switching timing for the load.

One problem with the FAPER device is that, without any randomization, the smallest movement of the frequency could result in all loads with FAPERs applied responding in the same way and doing so simultaneously. This could result in a destabilizing influence on the grid. A more gradual response is needed and the responsive load system offered this by distributing the frequencies to which each device is responsive by using a randomized function.

As mentioned above, the responsive load system of GB 2361118 defines a probability based method for choosing the frequency to which a device is sensitive. In this way, a progressively larger proportion of the responsive load device population changes the load as the system frequency departs from the nominal frequency of the grid.

In more detail, the responsive load system uses a randomizer to choose both a high frequency and a low frequency to which the device is sensitive. This is advantageous over the FAPER device as more and more load is switched on or off progressively as the frequency increases or decreases, respectively.

The random inputs for the high and low frequencies to which the devices are sensitive are revised from time to time. This step has the advantage of distributing any disadvantages of responsive devices among the population and ensuring that no one device was stuck with unfavorable frequency triggers. For example, it would not be appropriate if a particular device was constantly sensitive to the slightest change in frequency whereas another device had such broad trigger frequencies that it only provided frequency response in extreme grid stress situations.

One problem with this system is that the controller is not tamperproof. Users, such as users of air conditioning, might choose to turn up their controls because of the slight heating/cooling of a room beyond that desired as a result of a frequency responsive load change being noticed. Thus, if the air conditioner is generating in a lower temperature range, that is the air conditioner is working harder and is on more frequently, because of an increase in grid frequency, and a user notices this and turns the air conditioning down, before the frequency returns to an acceptable level, then the response has been lost.

Partially because of the above problem, the Grid Stability System of UK patent application number 0322278.3 was formed. The grid stability system prevents an end user from overriding the frequency response function by fixing the frequency triggers at pre-grid stress settings. In this way, manipulation of a set point controller, such as a thermostat, is made ineffective for the duration of the period of high stress.

The grid stability system also defines three states of the system, normal, stress and crisis. The stress level of the grid determines which of the above three grid states are relevant.

The stress level of the grid can be determined by comparing the present grid frequency to limit values for the frequency and determining whether the current frequency falls inside limits chosen to represent a normal state, a stressed state or a crisis state.

Rapid changes in frequency, whatever their absolute value, are also used as indicators of grid stress level by defining limits for the rate of change of the grid frequency.

The grid stress level can also be indicated by an integration, over time, of the deviation of the grid frequency from the nominal grid frequency. Thus, even if the extent of frequency departure is very small, if it departs for a long enough time, then a grid stress or crisis condition is still determined.

The grid status is, therefore, determined, according to the grid stability system, by taking into account instantaneous large frequency departures from nominal, rapid changes of frequency and accumulatively large, but not necessarily outside a preferred frequency change at any given time, departures all being signs of grid stress. Each of these possible types of grid indicators has an associated set of limits that individually or in combination determine whether the grid is in a normal state, a stressed state or a crisis state.

Having determined the status of the grid, that is whether the grid is in a normal state, a stressed state or a crisis state, the controller of the grid stabilizing system adapts its grid responsive behavior depending upon the determined grid status. If a normal status is determined, the device provides response to frequency changes in the same way as the original responsive load device. So, as grid frequency rises above the temperature determining trigger frequency, off devices will switch on in order to "take up" the extra generation. In the case that the grid frequency falls below a low frequency trigger value, "on" devices will switch off to reduce the load upon the grid.

If operated according to the FAPER invention, a physical variable associated with the load (water level, temperature) is still controlled within minimum and maximum values during this time, but the limits are extended so that devices switched on and devices already on will stay on for longer than if the controlled device was operating within the normal frequency limits. Similarly, in periods of overly high grid frequency, off devices will stay off for longer as the lower limit of the physical variable has been extended as well.

Using the example of the water tank, as grid frequency increases above the higher frequency limits, off devices will switch on and on devices will stay on until the physical variable reaches its extended limit or until the frequency returns below the higher frequency limits. If the normal range for the water tank depth lies between 1 and 1.5 meters, for example, if the grid frequency rises above the higher frequency limits, off devices will switch on and on devices will stay on up to an extended water depth of 1.7 meters, for example. Thus, the potential maximum level of the water tank has been raised above its normal level. Further, the potential energy of a population of water pumps controlled in this way will have increased their average depth of water. This serves to compensate the excessive generation, which produced the high grid frequency, and stored the excessive grid energy, which will compensate, to some extent, the higher frequency. When the frequency drops below the lower frequency limits, this energy is repaid to the grid by switching on devices off and keeping off devices off up to a lower extended physical variable limit of, for example, 0.8 meters. This allows a large population of devices to reduce their potential energy and supply the energy difference into the grid. This serves to compensate for the lack of generation that resulted in the low frequency.

If operated according to the responsive load system of GB2361118, the control limits remained unchanged, but the device could be switched on or off if the system frequency moved beyond the frequency to which the device was sensitive. So the device could be switched before it reached its control limits, and this extra switching modified the load and so contributed the change of load necessary to balance the system.

Using the example of the water tank again, low frequency would cause an on device to switch off at, for example, 1.4 m and so earlier than if the limit of 1.5 m was reached, and, conversely, high frequency would cause the device to switch on at, for example, 1.1 m and so earlier than if the lower limit of 1 meter was reached.

Together, these cause the average water level in a population of devices to become lower when the frequency is low, and to become higher when the frequency was high, although each individual device would operate within its control limits.

The frequency limits for a particular device are chosen to fall within an upper frequency range and a lower frequency range. As with the Responsive Load previously discussed, a randomizer is used to choose the particular high trigger frequency and the particular low trigger frequency such that a population of devices have high trigger frequencies and low trigger frequencies distributed within the upper frequency range and the lower frequency range, respectively. Thus, a window is provided between the distribution of high trigger frequencies and low trigger frequencies. This window is centered around the nominal frequency. The window allows the controlled load, e.g. a water tank, refrigerator or air conditioner, to operate entirely as normal, i.e. as though it did not have a frequency responsive controller applied to it, when the frequency of the grid is close enough to the nominal grid frequency to lie within the window. Response is provided only when the grid frequency extends outside this window.

In the case that a stressed state is determined, the control limits of the device are frozen at pre-stress settings so that manipulation of a control panel to adjust a set point for the sensed physical variable (e.g. temperature) is ineffective. Thus, the user of the controlled load cannot adjust the loads settings, for example by using a thermostat control. If the responsive device is controlling an air conditioner, a grid responsive induced change in room temperature could be noticed. A user may decide to attempt to counter the change in temperature by adjusting the thermostat. The responsive load device of the grid stabilizing system overrides such an adjustment of the set point when the grid is determined to be in a stressed condition. This is important as the grid is particularly sensitive during a period of grid stress and users negating the response provided could worsen the destabilization of the grid.

In extreme circumstances, when a risk of blackout exists, a grid crisis state may be determined. In the grid crisis state, the grid stabilizing system relaxes the control of the physical variable limits and allows them to move outside of a preferred range. In a high frequency grid state, the loads are switched on until the grid crisis state is exited and in a low frequency grid crisis state, the responsive load (e.g. fridge) is switched off until the crisis state is exited. The switching on and switching off is carried out irrespective of the control limits, so a fridge, for example, could continuously cool down to well below a preferred minimum or the fridge could be allowed to warm up to an ambient condition well above a preferred maximum temperature. These extreme measures are only taken in the most serious of grid conditions, when the alternative is a blackout.

Modeling of the prior art frequency and responsive control devices has uncovered previously unknown problems with the above described prior art grid responsive loads.

It has been found that after response has been affected for a period of time, a population of the devices will tend to approach the physical variable control limits, and start switching at an excessive rate. For example, a refrigeration unit controlled by a frequency responsive device will reach its extended temperature limits after a sustained period of high or low frequency. Using the example of a higher than nominal grid frequency, devices will switch on until the low temperature limit has been reached and will then switch off, but as soon as the temperature passes back over the low temperature limit the device will again check whether the grid frequency is above its higher frequency limits, and if so will switch on again immediately. This results in very frequent switching as the device is attempting to provide frequency response to a unit close to its physical variable limits. This is not desired behavior as it could damage the controlled loads. Excessive oscillating on and off switching of the load will reduce the lifespan of the device.

Also, modeling of the prior grid frequency responsive loads have been found to have an unexpected effect on the grid frequency. It was assumed that the responsive devices would smooth the grid frequency to provide a far clearer, less noisy, grid frequency. This did not, however, entirely bear out during modeling, and some previously unknown strange behavior of the grid frequency was observed as a result of the responsive loads.

The prior art grid responsive control devices do not provide any special assistance to a grid recovering from a blackout, but the stabilizing effect of responsive loads are needed more than ever at this time.

Amongst other objects, the present invention aims to have an improved stabilizing effect on a power grid.

The present invention also aims to reduce the switching of powering of an energy store during operation of a grid responsive device controlling the powering of the energy store.

The present invention also aims to aid the grid start-up after a blackout. In particular, the present invention aims to soften the shocks to the system during the black start process. The loads and generators can be reconnected more quickly, so speeding recovery.

The device of the present invention also aims to overcome the above identified problems with prior art grid responsive control devices.

SUMMARY OF INVENTION

The present invention provides a control device for controlling an energy consumption of a load on an electricity grid.

Conventionally, a nominal frequency of the grid and a current value of the physical variable is used for controlling the energy consumption of the load. The present invention, however, uses some function of the past readings of the physical variable.

A preferred form of the present invention encompasses a comprehensive grid responsive control device combinable with any of the below described other aspects of the invention or any of the below described preferred features.

Aspects of the invention allow the energy consumption of the loads to be changed in a way that varies with the sensed physical variable of the load. By taking into account the variable of the load in this way, the energy consumption of the load can be controlled to minimize the rate of changes in the energy consumption of the load. This is so because loads closer to their natural switching points (which is determined by the variable of the load) are favored for grid responsive control.

The preferred embodiments described below are applicable as preferred embodiments of the methods of the present invention or the apparatus. Thus, the features of the preferred embodiments may be adapted to include the means of a control device for performing the feature or may be adapted to comprise method steps. The preferred features are generally worded in apparatus terms, but are applicable to all aspects of the present invention.

In a preferred embodiment of the first and second aspects of the invention, the control device is adapted to determine a trigger value of the physical variable of the grid and to vary the energy consumption of the load when a current value of the sensed physical variable of the grid reaches the trigger value.

The control device may determine a trigger value based upon just the sensed physical variable of the load or both the sensed physical variable of the load and the sensed physical variable of the grid, or just the sensed physical variable of the grid. This combination of features of the present invention is advantageous as set out in more detail below.

According to a preferred form of the aspects of the invention, the means for determining the trigger value comprises a function for randomly providing the trigger value between a determined upper or lower value of the physical variable of the grid and the central value.

The control device may also preferably be adapted to generate a random value and to determine the trigger value based further upon said random value and to control the energy consumption of the load dependent upon the trigger value.

Thus, all aspects of the present invention may advantageously utilize a random value in determining the trigger value as this will provide a randomized element to the trigger value, meaning that a population of loads controlled in this way will not all change their energy consumption in a synchronized way, which would destabilize the grid.

According to a further preferred feature, the control of the energy consumption of the loads is performed by comparing the trigger value of the physical variable of the grid with the current sensed physical variable of the grid.

In a preferred embodiment, the physical variable of the grid is a frequency and so it is the frequency of the grid which is sensed. Alternatively, an amplitude of the supply voltage could be sensed, which also shows dependence upon the balance between generation and load of the grid.

Thus, according to one preferred embodiment of the present invention a central frequency is determined from past readings of the frequency of the grid and the control device tends to resist any change in frequency, up or down, to some extent regardless of the absolute frequency of the grid. Thus, while in prior art grid frequency responsive control devices it is the nominal frequency of the grid which is used as a reference point for determining whether to provide response, the present invention, differs in using a historical value, around which the response trigger frequency is set.

The basic concept is that even during a period in which the frequency drops below nominal, if the frequency starts to rise, then the responsive control device will function to resist this change, despite the frequency actually moving closer to nominal, which conventionally was considered favorable.

During periods of low frequency, the average input energy in a population of loads drops in order to reduce the energy extraction from the grid and, therefore, compensates for the excessive load causing the frequency drop. Energy is, in effect, being loaned to the grid.

Ideal behavior would be to recover this energy, and restore the total energy store, before the frequency again returns to the nominal grid frequency. So a frequency rising from a below nominal value is the most favored time to repay the energy to the grid.

Similarly, but symmetrically, during a period of above nominal frequency on the grid, the loads are controlled to borrow energy from the grid in order to take up some of the excess generation. The favored behavior is to return this energy before the frequency again reaches the grid nominal frequency.

The behavior of the control device reinforces the natural emergent property of grids by which the frequency is an indication of excesses or deficits of energy in the grid. If the frequency is low, there is an energy deficit, and if high, there is a surplus. If the deficit or surplus is largely absorbed by the loads, then the frequency signal is made clearer.

The trigger value is a value, e.g. frequency, at which responsive control devices will either increase or decrease their energy consumption and is determined based upon this central value. Thus, for example, for a population of such control devices, if the current frequency is above the central frequency, the energy consumption of the load will tend to increase, and if below, the energy consumption of the load will tend to decrease.

A random element is also preferably included in the determination of the trigger value to ensure that the increasing or decreasing of loads is gradual so as to not burden the grid with a population of loads all switching at the same time, thereby negating the stabilization object of the control device. Thus, large scale synchronized switching is avoided.

In a preferred embodiment, the device is further adapted to: sense a physical variable associated with the load; determine upper and lower limits for the physical variable associated with the load; and change the energy consumption of the load when the physical variable associated with the load reaches its upper or lower limits.

This feature ensures the load still performs its main function, which is to maintain a variable associated with the load within certain limits. These limits may be derived from a user selection. For example, the set point of a thermostat for air-conditioning or a refrigerator setting would lead to limits being defined. The temperature of the space being conditioned or refrigerated should not exceed or go outside of these limits. The temperature is kept around a desired temperature. A refrigerator, for example, would operate to a duty cycle such that when the temperature reaches its upper limits, the cooling mechanism of the refrigerator will be switched on so as to lower the temperature. Of course, once the temperature reaches its lower limits, the refrigerator will switch off.

The majority of the description that follows is concerned with the loads that control the physical variable of the load within the control limits by turning the energy consumption on or off. However, loads in which this control is achieved by increasing or decreasing the energy continuously are also applicable with the control device of the claimed invention.

The preferred embodiment provides two layers of control, the first is to increase or decrease the energy consumption of the load to keep the physical variable associated with the load within its control limits and the second layer is to further control the energy consumption of the load depending upon relative rises or falls of the grid variable.

As described above, one of the problems with prior art grid responsive devices was that this two layer control tended to increase switching rates after a prolonged frequency deviation. The present invention aims to combat this switching rate increase and the third and fourth aspects of the present invention, and preferred embodiments of the first and second aspects of the invention, are directed to encompass the achievement of this objective.

In a preferred embodiment, this objective is also achieved by the trigger value (or trigger frequency) being based upon the sensed physical variable of the load. In a preferred form, the means for determining the trigger value is configured to determine the trigger value in dependence on the sensed physical variable of the load and the control limits so as to reduce the rate of variation of the load.

In another preferred form, the means for determining the trigger value comprises a function which returns the trigger value in dependence upon the sensed physical variable of the load, said function defining a trigger value profile varying with said physical variable of the load, said profile such that the more recently the energy consumption of the load has varied, the further the trigger value is from a central value of the physical variable of the grid.

More specifically, in a further preferred embodiment the provision of a trigger value (e.g. frequency) is further based upon a ratio of a value representing said sensed physical variable relative to the upper or the lower limit of the sensed physical variable associated with the load to a range between the upper limit and the lower limit.

The above defined ratio is an indication of how much energy is stored in the load compared with the maximum or minimum defined by the control limits. Again, in the case of a refrigerator, when the refrigerator has been on for 50 percent of the on portion of the duty cycle of the refrigerator, then the sensed variable associated with the load will be half way to its lower temperature limit or, in other words, the refrigerator is half way to its maximum input energy. In determining the trigger frequency for the preferred embodiment, the controlling device takes into account how full the energy store is and, therefore, how close it is to a natural switching point.

In an extension of this embodiment, the trigger value varies with the ratio such that the likelihood of the energy consumption of the load being changed increases as the ratio increases. Thus, the ratio increases depending upon the length of time the load has been in a particular consumption state. For example, in the case of a refrigerator, the cooling provision means being in an off state is one particular energy consumption state and the cooling provision means being in an on state is another particular energy consumption state. In a preferred form, a first consumption state is one in which the energy stored by the load is increasing and a second consumption state is one in which the energy stored by the load is decreasing.

The ratio can be any function representative of how long the load has been in a particular energy consumption state. Thus, in a preferred embodiment a ratio is defined representing the length of time a load has been in a particular energy consumption state relative to a maximum time for that state. Preferably, this representation is derived from the physical variable associated with the load and its upper and lower limits.

The ratio is defined such that it will increase the longer the refrigerator is on and is also defined such that it will increase the longer the refrigerator is switched off. If the likelihood of the energy consumption state of the load changing increases as this ratio increases then the switching of the load between energy consumption states is minimized. This is, as mentioned before, important for preventing long term damage to the load equipment, which would be unacceptable to the consumer.

It is an important feature of preferred embodiments that the determined trigger value takes into account how close the load is to a natural switching point or how long the load has been in a particular energy consumption state as compared to a maximum length of time as determined by how close the physical variable associated with the load is to the loads maximum and minimum values for that variable. A refrigerator in a "cooling on" state is closer to its natural switching point as the sensed physical variable approaches a lower limit for the temperature of the refrigerator. Conversely, the refrigerator in a "cooling off" state is closer to its natural switching point as the sensed physical variable approaches an upper limit for the temperature of the refrigeration space.

Thus, some ratio representing the sensed physical variable's relative position between the maximum and minimum limits for the physical variable associated with the load is the preferred way for determining the load's natural switching point. The ratio is taken into account by the function calculating the device's trigger frequency.

In a preferred embodiment, the control device is adapted to determine an upper and a lower limit for the physical variable of the grid; wherein the provision of a trigger value is further based upon said upper and lower limits for the physical variable of the grid. In this way, the control device appropriately distributes the trigger frequency of a population of the devices between the upper and lower limit in order to provide response when it is needed.

In a preferred embodiment, the value of the trigger frequency is such that loads remaining in a particular state for a longer time than others are more sensitive to changes in the sensed variable of the grid by providing an appropriate function for calculating the trigger value biased in this way.

More particularly, the provision of a trigger value preferably first involves the control device being adapted to provide a base value of the physical variable grid based upon said random value and said central value, for example to randomly provide said base value between said central value and said upper or lower control limits; the control device is further adapted to provide a trigger value function from said base value; and then determine the trigger value from the trigger value function.

Thus, the randomization provided by the random value is directed to the provision of a base value, which is, in turn, determinative of a particular function used to provide the trigger value. In a particularly preferred embodiment, the trigger value function defines a trigger value varying with the length of time that the load has been in a particular energy consumption state. More preferably, the trigger frequency is provided from the trigger value function varying as described above.

Thus, each device is first provided with a randomized base value, from which is provided a trigger value function. The particular form of the function, i.e. how it varies with the ratio, is dependant upon the value of the base value. Thus, the increase or decrease in likelihood of the load changing its energy consumption state is different depending upon the base value.

According to the preferred embodiments of the present invention, each control device in a population will determine its own base frequency. The base frequencies will be distributed randomly across the population so that the changing of the energy consumption of the loads or the switching of the loads is progressive across the population.

According to the preferred embodiments, once this base frequency has been determined, the exact frequency to which the device is responsive depends upon the triggering frequency determined from the triggering value function. This function is defined such that the willingness of the load's response varies according to its internal state. If it is in a very low energy state, and the device is on, or in a first state of increasing the energy stored by the load, it will not wish to switch off or to switch to a second state of decreasing the energy stored by the load except in the most extreme of grid states (as represented by the physical variable of the grid, i.e. the frequency) but if its energy store is approaching the upper limit, it is very willing to switch off or to the second state. This changing willingness is reflected by the extent to which the trigger frequency departs from the central frequency.

Thus, the trigger frequency is provided with a nonlinear trajectory as the energy state of the load varies. In order to preserve the random distribution of likelihood of switching across the population, the form of the trigger value function changes depending upon the randomly provided base value.

By changing the willingness in this way, switching will be as rare as possible, and the switching load is distributed across the loads. This also serves to maintain the diversity of the load, by avoiding building up a sub-population that is very close to the limits.

In a preferred embodiment the random value is provided from a randomizer configured to provide a distribution of base values for a population of said control devices, said distribution extending from a limit of the physical variable of the grid to the central value of the physical variable of the grid. This is in contrast to prior art devices where a window is defined in which grid response is not provided and in which the device is allowed to behave as normal, as though it had no responsive control device installed.

The present invention, however, distributes the population of trigger values from a central value to a limit and, thus, response is provided at all frequencies between the determined upper and lower limits for the frequency of the grid. In this way, borrowing of energy from the grid or repayment of energy so borrowed from the grid occurs throughout the determined frequency spectrum of the grid. This is influential in providing a damping to all movements of grid frequency from the central frequency.

It is also preferred that the randomizer is such that a population of the control devices will have trigger values having a distribution extending between the upper and lower limit of the physical variable of the grid.

In a preferred embodiment, the change of the energy consumption of the load involves either switching the load on or switching the load off. A load is defined as the energy consumption associated with the main function of the load. For example, in the case of the refrigerator, the load is the energy consumption of the cooling provision means. Thus, using this definition, background operation of a refrigerator, such as lighting or other peripheries to the main function of the load, is not considered the load in the context of the specification.

In a further preferred embodiment, the provision of a trigger value is further based upon the particular energy state of the load (e.g. whether the load is an on or off state). Also preferably, the ratio representing how close the device is to the sensed physical variable reaching a limit, is dependent upon the particular energy consumption state of the load. Thus, according to the preferred embodiments of the present invention, the ratio is defined differently depending upon the particular energy state of the load (e.g. whether the load is on or off or in the first state or second state).

This is advantageous as an off load, for example, will switch on normally at a low load variable limit (minimum stored energy). An on load, on the other hand, is approaching its natural switching point at a high load variable limit (maximum energy stored). It is, therefore, preferred to take the energy consumption state of a load into account when defining the trigger frequency.

In yet another preferred embodiment, the upper and lower limits associated with the load are derived from a setpoint of the physical variable associated with the load. A set point could, for example, be defined by a thermostat setting or the particular setting of a refrigerator. It is an advantageous feature of the present invention that not only is a good stabilizing effect achieved by providing grid frequency response, but also that the primary function of the load, for example, cooling, heating, pumping etc. is carried out.

There are certain grid conditions in which the limits of the sensed physical variable associated with the load are controlled to be changed for an extended period of time. These changing of the limits is not usually related to the provision of normal grid responsive behavior, nor is it due to a change in a setpoint for the physical variable. The extended change of the limits is more usually due to a grid condition.

According to a preferred embodiment of the invention, the upper and/or lower limit of the sensed physical variable are increased or decreased at a rate less than or more than, respectively, a maximum rate of increase or decrease of the sensed physical variable of the load.

In this way, the limits are moved at a rate less than the physical variable could theoretically move. The lower rate of the limit movement means that there is still some provision for the load to be grid responsive even while variable limits are being changed.

One example of a grid condition where this is useful is during start-up after a power outage. As discussed above, the grid is particularly delicate at this stage. Normally, the sensed physical variable will be outside its normal range after a power cut and the load will need to be operated to bring the variable back within its preferred control limits. According to a preferred aspect of the present invention, the upper and/or lower limit of the sensed physical variable is increased at a rate less than a constant maximum energy consumption of the load.

Thus, there is potential during the increase in the limits to provide response. This ability of the load to provide grid responsive behavior is especially important during black start as the grid is especially delicate at this time.

In another preferred embodiment, the present invention defines a black start assistance mode in which a random delay is provided before the load draws energy from the grid. This preferred feature means that loads will start drawing energy from the grid gradually, rather than them all coming on-line at the same time and severely stressing the grid.

BRIEF DESCRIPTION OF THE DRAWINGS

Preferred forms of the present invention will be described below with reference to the following drawings.

FIGS. 1A to 1C show a preferred form of how the trigger frequency varies with energy stored in the load.

DETAILED DESCRIPTION OF THE INVENTION

Figure 1C:
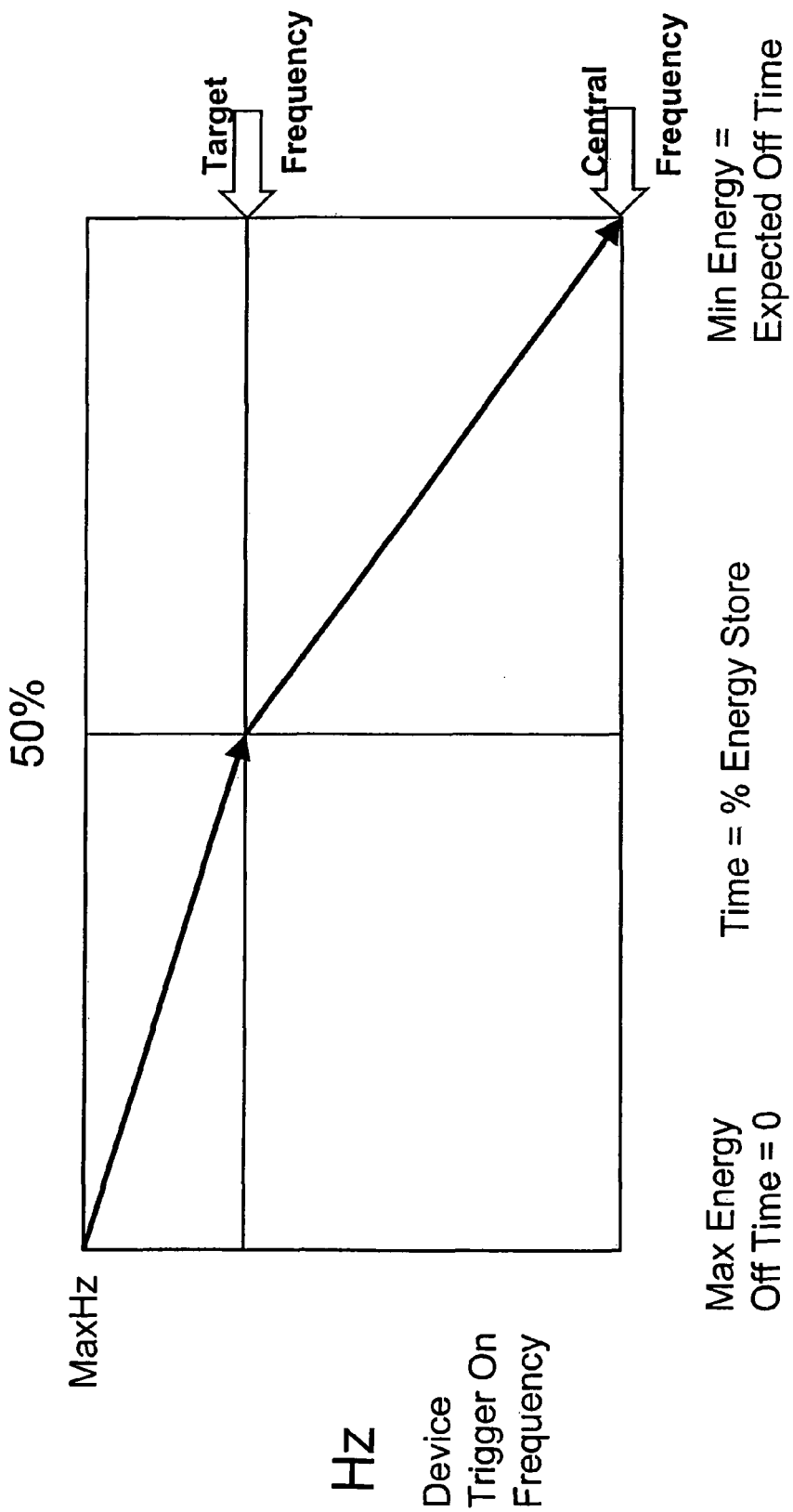

Specific embodiments of the present invention will now be described in order to aid in the understanding of the present invention.

The control device of the present invention is applicable to energy storage loads on a grid, which consume intermittent or variable energy.

The control device requires two main inputs, the first is a frequency of the grid, or another parameter representative of the balance between power generation and power requirement, and the second some physical variable associated with the energy storage load. Generally, the primary function of the load is to maintain the physical variable within specified control limits.

The loads will generally operate on a duty cycle of some kind, usually with a period in which the load is on and with a period in which the load is off. Thus, a duty cycle of 50% means that the load will be on and off for an equal amount of time. Specific loads of this kind to which the present invention are applicable include space conditioners (e.g. heating or cooling), refrigerators and water storage pumps, amongst others.

However, modern power electronic control also makes it feasible to vary the power consumed by a motor. This can make the motor more efficient, and also means the motor is running continuously or nearly continuously, with the power varied according to the demands of the device. So in a fridge, for example, the motor will reduce its power when the temperature has reached its desired set point, will increase if the temperature rises, and will reduce further if the fridge gets too cool. For fridges this also has some benefits in perception of noise.

The motor will generally need to operate over quite a wide power range, as, in a fridge or freezer, for example, it will have to have the capacity to cool a warm fridge rapidly when it is switched on or when a warm mass is put into it. So there remains scope for temporarily changing the power demands of the device from inputs other than the temperature—such as the frequency.

The present invention provides a control device operable to vary the energy consumed by both types of loads, i.e. by binary on/off control and by graduated or continuous increase and decrease of the energy consumption.

For the remaining description, a refrigerator will serve as the main example for use with the control device of the present invention.

The present invention operates, up to a point, in common with grid responsive control devices known from the prior art. The present invention utilizes the principle that energy store loads, as described above, can perform their function without requiring input energy from the grid at a specified time. Unlike lighting and other such loads, energy store loads can receive input energy at varying levels or varying intervals and still operate in a fully satisfactory manner, provided they are controlled so as to keep the physical variable of the load within the specified control limits of the particular load.

The amounts of energy stored by the above described energy storage devices is determined by the control limits of the physical variable. In the case of a refrigerator, the maximum amount of energy stored by the load is defined by the lower temperature limit for the current setpoint setting of the refrigerator and the minimum amount of energy stored is the higher temperature limit.

In the following description, y is the normalized measurement of the physical variable of the load being controlled by the grid responsive control device of the present invention. A larger y implies more input energy is stored (i.e. the refrigerator is coolest) than a smaller y. If x represents the energy in the store, then y is a function of x, i.e. $y=f(x)$. A normalized y can range from 0, with no energy stored, to 1, a critical maximum level of energy stored. The function is normally sufficiently close to linear to make this a useful approximation.

In the case of a refrigerator, the input energy is directed towards cooling. So y is greatest, 1, when the fridge is at its coldest possible, and 0 when the internal temperature rises to ambient. In the case of a tank, y is 0 when the tank is empty, and 1 at a level when the tank overflows. Normally, of course, it is controlled to within narrower limits, and these are referred to as the upper and lower limits of the physical variable, or ymax and ymin.

According to known principles of grid responsive loads, at a particular setting of the load, the input energy is varied to keep the physical variable y within the limits set by ymin and ymax, in the same way as the load would normally be operated, except the frequency of the grid (or some other parameter associated with the balance between generation and load on the grid) is taken into account.

Speaking generally, a load, of the type applicable with the present invention, operated without a grid responsive controller would switch the load on when the minimum value of y (ymin) is reached and switch the load off when its maximum value (ymax) is reached.

According to the grid responsive controller of the preferred embodiment, the timing of the switching, when an on load is switched off or when an on load is switched on, is adjusted depending upon the frequency of the grid. During a period of low frequency, for example, there is too much load on the grid and not enough generation to match it, and a grid responsive device which is on will react by switching off (or switching to a decreased energy consumption state) before it would normally have switched off, i.e. before y reaches ymax. Likewise, during a period of high frequency, more load is needed to take up the excess in generation and the loads will be switched on (or switched to an increased energy consumption state) before ymin is reached.

Further, an extended set of upper and lower limits for the sensed variable can be determined in order to improve the amount of response provided. So, during a period of high frequency, grid responsive loads will be switched on and the maximum value for the sensed variable (ymax) can be increased such that the loads having been switched on remain on for a longer than normal period of time, as will loads that were already on. A similar provision is utilized during periods of low frequency.

The preferred control device of the present invention defines a status for the grid, so as to determine the exact type of response to changes in frequency provided by the grid responsive control device. The grid responsive control device has three modes of operation, a "normal" mode, a "stress" mode and a "crisis" mode, in a similar way to the system described in UK patent application no. 0322278.3.

The preferred embodiment of the present invention determines the mode of operation of the controller and the associated grid status from a defined function of the frequency, hereinafter called h. The function h determines from the behavior of the grid frequency the current status of the grid. Ideally h represents to some extent a measure of how much energy has been borrowed from or loaned to the energy store loads.

The function h preferably includes three principal terms, a proportionate term, an integral term and a derivative term. These three terms will give a good indication of the stability state of the grid.

The proportionate term is the current frequency deviation from the nominal frequency of the grid or some other central value that represents how much the frequency needs to be corrected to return to the desired central value.

The integral term represents a longer term (as compared to the instantaneous proportionate term) view of the frequency error. This term is useful, as a small error for a long time, will influence the function h and, thus, be taken into account in providing grid stability response. The integral term can be a sum of a set amount of past frequency deviations or can be a moving average of past frequency deviations. Rather than from time zero, the integral term can be measured since the last time the frequency deviation was zero.

The derivative term is related to the current instability of the grid. It can be a rate of change of frequency deviation. Thus, large swings in frequency will also affect the function h and can be an indication of an unstable grid, even if the actual present deviation of the grid frequency is not outside preferred limits.

In equation form, the function h can be written $$h = Pfc + ICc - Dfc$$

where fc is the proportionate term, Cc is the integral term and fc is the derivative term. P, I and D are constants for influencing the degree of importance to the function h of each of the terms.

The integral term Cc may be calculated by (fcS), where S is the sample integral.

The three parameters, P, I and D should be enough for the control device to derive h, but for completeness and flexibility, it may be appropriate to extend this to quadratic or cubic terms.

According to the preferred implementation of the present invention, the grid status is inferred from the function h. For example, if h is below a first limit, then a "normal" status of the grid is determined. If h is between the first limit and a second, greater limit, than a "stress" condition for the grid is determined. If h is between the second limit and a third, greater, limit, then a "crisis" condition is determined. The difference between the modes of operation associated with each of these grid states is similar to that described in UK patent application no. 0322278.3.

The function h is a useful way of determining the stress under which the grid is operating. Appropriate setting of the parameters P, I and D of h enable the function to appropriately distinguish the three general states of the grid.

During the normal mode of operation, the grid responsive control device of the present invention will operate as fully described below. During stress mode of operation, a user of the energy store load is not allowed to adjust a setpoint of the physical variable associated with the load. Thus, negation of the grid responsive compensation provided by the present invention is not possible. During a crisis state, the energy store load is operating without regard to the desired range of the physical variable associated with the load. The load's physical variable is allowed to reach the absolute limits of y rather than the preferred range represented by ymax and ymin. For example, in a crisis state, a refrigerator could be allowed to reach an ambient temperature, or be allowed to go to the lowest temperature that the refrigerator is capable of achieving. Similarly, in the case of a water tank, the water level could be allowed to reach empty or extend up to a full tank level.

A main mode of practicing the principles of the present invention is now described. Other preferred embodiments of the invention follow.

The grid responsive controller of the present invention includes a control mechanism for actively and continuously damping grid frequency variation. The grid responsive control device of the present invention is responsive to all frequency variations from a central value, which is defined as an average value over a predetermined sample period of historical frequency readings.

When the control device is first used, the central value will be set to the current frequency. The central value will then evolve as past samples of the grid frequency are incorporated into the moving average. The central frequency is the average value of the grid frequency since the start of the sample period.

Any movement of the grid frequency from the central frequency is resisted by the population of responsive control devices of the present invention. If the current frequency is above the central value, then the responsive control devices will tend to switch on their loads to compensate for the increase. If the current grid frequency falls below the central value, then on devices will tend to switch off to compensate for the deficit in generation. This provides an overriding stabilizing effect on the grid, as represented by a clearer, or less noisy, grid frequency signal.

The loads will not all change energy consumption status at the same time. The control device of the present invention is adapted to ensure the loads are switched in a progressive way such that greater deviation from the central value results in more loads tending to switch on/off. This progressive switching is important in order to ensure that the response of a population of loads is not simultaneous, which would provide a destabilizing influence to the grid. The randomization is described in more detail below.

In the preferred implementation of the responsive control device of the present invention, the sample period of calculating the central frequency value is taken as the period since the central frequency last crossed the nominal frequency of the grid.

The present invention defines high frequency excursions, when the central frequency moves above nominal, and low frequency excursions, when the central frequency is below nominal. The end of one of these types of excursions marks the start of the other. These cross-overs have been found to be a convenient time for beginning accumulation of frequency readings for calculation of the central frequency. Thus, the central frequency will be calculated for each high excursion (above nominal) or low excursion (below nominal) of the central frequency. The central frequency will, therefore, be calculated as a moving average of the frequency during the current excursion and is reset once the central frequency crosses nominal and a change of excursion (e.g. high to low excursion or vice versa) occurs.

An advantage of choosing above nominal or below nominal excursions for the sample period is that devices will end-up having a shared common view of the central frequency. Loads that are recently connected to the grid, and so have no history, will soon come to see the same recent history as other devices, since the central frequency crossing over the nominal frequency of the grid is expected to occur frequently enough. It is useful for the devices to appreciate a common central frequency as it allows their behavior to be coordinated (but not synchronized) in an intended manner.

This sample period may not always be appropriate. If the excursion lasts for a period that approaches the average on or off cycle of the energy storage device, the devices may well be called upon to provide grid responsive behavior without having had the opportunity to reach their maximum or minimum energy store. This could have an adverse effect on switching rates of the energy storage loads. Further, if the load does not reach its maximum energy store, and fully replenish itself, then the population of such loads will, on average, be depleted. It may be that the control device will have to be adapted slightly in order to be useful in such circumstances.

It is envisaged that the moving average for obtaining the central frequency could be a weighted moving average, such that the most recent frequency terms are given more importance. In this way, movements of frequency from recently obtained values will more likely provide load response and could be compensated for. This will further help to stabilize any frequency movement of the grid.

The grid responsive control device of certain aspects of the present invention also includes a further improvement aimed to minimize switching of a load and to distribute energy variations across the available population of the loads. As described in further detail below, this is achieved by varying the trigger frequency of the device as it progresses through the current on or off state.

A trigger frequency is the frequency of the grid at which the load will be controlled to switch from an on state to an off state or an off state to an on state. The loads will also be switched on or off when the sensed variable associated with the load reaches its current minimum or maximum, as defined by ymin and ymax.

The grid responsive control device is adapted to determine a target (or base) frequency in a random way. In a population of such devices, the target frequencies will be distributed randomly across the population so that the above described progressive response is achieved.

According to a preferred embodiment of the present invention, the device's target frequency is the frequency to which, on average, the device will respond. The current triggering frequency, however, which is the frequency of the grid at which the load will switch between on and off states, is not usually the same as the target frequency. The target frequency is a randomly chosen frequency, from which a unique profile for determining the trigger frequency, the grid frequency that will cause the device to trigger between states, is derived.

So, the profile for the trigger frequency is derived from a function, which, in turn, is dependent upon the randomly chosen target frequency. The actual trigger frequency used by the control device is derived from this function, which is preferably a function of how long the device has been in its current energy consumption state, i.e. how long it has been on for or off for.

How long a device has been on or off for, is determined relative to a natural switching point, which is the point at which the sensed physical variable will reach its current maximum or minimum values for the sensed physical variable (ymax and ymin) and would, therefore, switch anyway. Thus, the function for determining the device's trigger frequency is also a function of the value of the sensed variable relative to its minimum or maximum values.

The current trigger frequency is, therefore, dependent upon the current value of y. According to the preferred embodiment of the present invention, the trajectory of the trigger frequency is biased such that the further away a load is from its natural switching point, the trigger frequency will be a less likely frequency of the grid, i.e. the trigger frequency will be further away from nominal. Thus, the device is less likely to switch the further away it is from a natural switching point.

Preferably, the trajectory of the trigger frequency is biased in such a way that half the time the device is less sensitive than the randomly chosen target frequency, and half the time it is more sensitive. Thus, preferably, the average of the trigger frequency is the target frequency.

In the preferred embodiments, the length of time in which a load has been in either the on or the off state is calculated from the current value of the sensed variable as compared to a range allowed for that variable as defined by the current values of ymax and ymin. This could, for example, be expressed as a percentage. For the sake of illustration, a load device which is in an on state with the sensed variable close to reaching a maximum of the sensed variable could have been on for 80% of its normal on period. This can be expressed formulaically as $$ton = (y - ymin)/(ymax - ymin)$$

where ton is the amount of time that the load has been switched on relative to its expected on time and y is the current value of the sensed variable.

How long the device has been off for is defined using a different formula, but the same principle applies. The closer an off device is to its lower limit ymin, the longer it has been off for. Thus, the appropriate formula is as follows:

$$toff = (ymax - y)/(ymax - ymin)$$

where toff is the relative amount of off time as compared to the expected amount of off time for the load.

FIGS. 1A, 1B and 1C show example forms of the profile of the trigger frequency function. Frequency is plotted up the y-axis and percent fullness/emptiness, in terms of energy, of the energy store load is plotted along the x-axis.

FIG. 1A shows the frequency at which an on device will switch off. As is unique to the present invention, the trigger frequency is dependent upon the time for which the device has been on, as compared to the expected time (ymax reached). As can be seen from FIG. 1A, for 50% of the time, the trigger frequency is relatively close to the central or nominal frequency, for the other 50% of the time, the trigger frequency is further away from these frequencies. Thus, it is only during the more extreme grid circumstances that the devices which have only been on for 50% or less of their expected on time will be triggered. This is based on the assumption that the grid frequency will, for the majority of the time, reside around the central or nominal frequency and, thus, trigger frequencies that are closer to this are more likely to be achieved by the grid. Thus, switching the load is more likely to take place the closer the triggering frequencies are to the nominal or central frequency.

It is also important to appreciate that the exact form of the trigger frequency's dependency upon time on or off compared to the expected time on or off is chosen by the target frequency, which is randomly chosen. In this way, a population of loads will provide a diversified grid frequency response.

Comparing FIG. 1B with FIG. 1A illustrates the profile dependence upon the target frequency chosen. It can be concluded that while the trigger frequency is always varied with the percent of expected on or off time of the load, the form of this variance is determined by the randomly chosen target frequency.

FIGS. 1A and 1B show the trigger frequency for an on device. FIG. 1C, conversely, shows the profile for an off device. The principles are the same. Namely, the frequency at which an off device will switch on varies depending upon the percent of expected off time, as defined by the above formula. As can be seen from FIG. 1C, the trigger frequency approaches the central frequency or the nominal frequency of the grid as the device approaches its natural switching on point. Generally, the profile requires that the closer the device is to its natural switching on point, the closer the frequency to the damping or nominal frequency and, therefore, the more likely the load will be used for providing grid frequency response.

According to the preferred implementation of the invention, any movement of sensed grid frequency above or below the central frequency will result in loads being switched. The further the sensed grid frequency is from the central frequency, the progressively more loads that will switch. Since the central frequency is a moving average of past frequency ranges, the central frequency will tend to "follow" the sensed grid frequency, although in a damped manner. This will provide a smooth central value for using to determine whether to perform high frequency (above nominal) or low frequency (below nominal) response.

The sensed frequency may well change direction and go above or below the central frequency. The device of the present invention will resist any rapid increases or decreases in the grid frequency above or below the central frequency by borrowing or repaying energy from or to the grid as soon as the grid frequency starts to move. This is the appropriate time for the energy borrowing or repayment, as discovered by the present inventor, and provides a far more stable grid frequency, as compared to the prior art grid responsive control frequencies.

At first, any movement above or below the grid central frequency only switches loads that are near to their natural switching points. This is because of the trigger frequency being variable for a particular device with on or off time for a device. All loads that have been on or off for greater than 50% of their expected on or off time are favored. It is only when the grid frequency moves dramatically away from the central frequency that devices that are less than 50% of the time away from their previous switching point will switch.

Thus, the preferred implementation of the present invention provides a more stable grid frequency, thereby inherently resulting in less switching of the responsive load. Furthermore, switching of devices that have already been switched is disfavored, thereby further decreasing the switching burden on the load.

A system consisting of a population of energy store loads controlled by the grid responsive control devices of the present invention provides a population of loads ready to switch in response to any change in the grid frequency. The larger the change in frequency, the larger the population of loads providing response. This should be a linear relationship.

Figure 2:
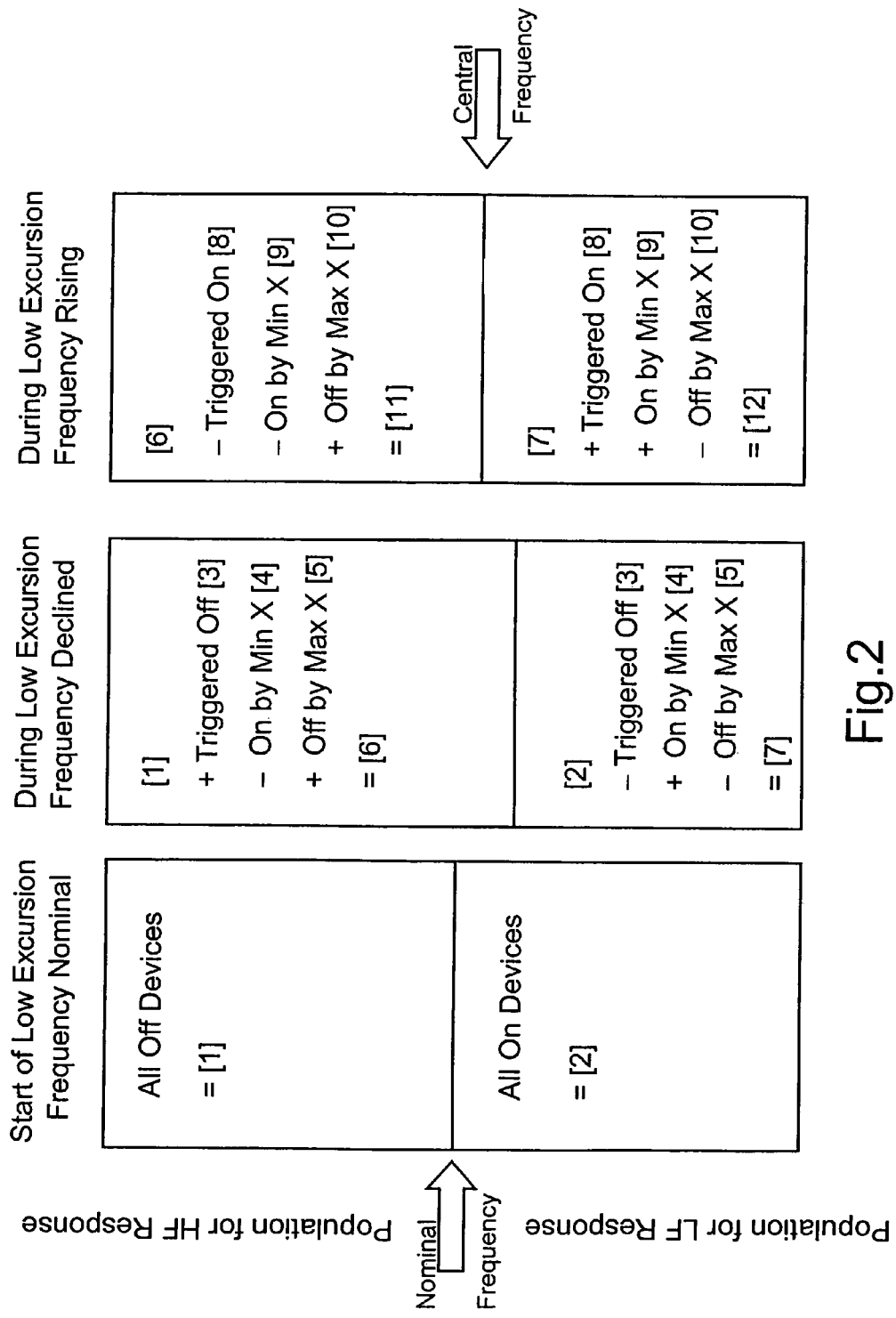
FIG. 2 shows an example population of the loads controlled according to a preferred form of the present invention.

FIG. 2 shows an example of a system being controlled in accordance with the present invention, in a stable state and running at the grid's normal frequency. As shown in FIG. 2, in this state the portion of devices that are off [1] and the portion of devices that are on [2] corresponds to the expected duty cycle. So, if the load is run at a 50% duty cycle, the population is evenly divided.

If the system moves into a low (below nominal) frequency excursion, on loads will be triggered off [3] in order to reduce the load. They will become unlikely to switch on again for a while.

During this low frequency excursion, some off loads will be switched on [4], despite the current excess of load on the frequency, because of the fact that they have reached their minimum energy store state and proper function of the load requires it to switch on. These loads were not called on to provide high frequency response, and are lost from the population of loads capable of providing high frequency response, even though they were actually the most sensitive. Again, these recently switched loads are unlikely to switch on again for a while.

Some loads will reach their maximum energy state, and will need to be switched off [5]. If the duty cycle is 50% the number of devices reaching their maximum energy state [5] will tend to be the same as the number of devices reaching their minimum energy state [4].

The remaining devices capable of providing low frequency response [7] is the population that had the less sensitive frequency settings, since those close to the nominal grid frequency have been "used up".

If the frequency now rises above the central frequency, then, despite the frequency still being below the nominal grid frequency, it is desired that the loads begin to switch on and start recovering the energy loaned to the grid earlier.

As the frequency rises above the central frequency, some devices will be triggered on [8] in order to increase their load. These are most likely to be drawn from the population remaining from [1], as the loads [3] will be in a minimum switching mode since they were only recently switched.

As before, some on devices will come off [10], and some off devices will come on [9] because they have reached their maximum or minimum energy state, respectively, without being called upon to provide high frequency response. While the on devices coming off [10] were the most sensitive for providing response of the population, they were lost to the population for providing low frequency response, without being used. This population of loads reaching their minimum or maximum energy states will be quite small.

The population of devices continuing to be able to provide high frequency response is as desired, in as much as they are reasonably evenly distributed amongst the frequency between the central frequency and a maximum limit frequency. The population of devices sensitive to frequencies immediately below the central frequency has, however, become depleted. So a downturn in frequency again will trigger less load reduction than before resulting in an average frequency that will fall even further until an undepleted zone is reached, or the natural migration of trigger frequencies repopulate the depleted zone.

This is desired behavior. During a low frequency excursion where the frequency is undulating, the frequency will tend to fall more easily than it rises (or, more generally, move further from nominal more easily than it approaches nominal). This reflects the fact that the loads are lending energy to the grid and resisting rising frequency as the loan is repaid. Ideally, it is only when the loan is fully repaid that the frequency returns to nominal.

One possible manipulation of the low frequency population shown in FIG. 2 is to distribute remaining on loads across the range between the central frequency and the minimum frequency (rather than between the nominal frequency and the minimum frequency). This has the effect of leaving the frequencies immediately below the central frequency additionally depleted (as devices that would have chosen target frequencies above the central frequency, between the nominal frequency and the central frequency now have them below the central frequency) so the frequency has a greater tendency to drop. This may not be desirable.

In an alternative to this manipulation, this change could be made only for some loads, such as those that have switched on since the start of the low frequency excursion. The logic of this arises because the devices which have switched on since the start of the excursion would have done so because they are low in energy, and so need an opportunity to replenish this energy before they provide a response. One way to affect this is to systematically lower (make more extreme) the frequency at which they will switch on. This, in turn, will tend to allow the grid frequency to fall further. It will, in extreme circumstances, also tend to distribute the on time more evenly among devices. The on time is, without this modification, already evenly distributed across devices by the trajectory of the trigger frequency.

The example shown in FIG. 2 is for a low frequency excursion, the behavior of a population of loads during a high frequency excursion is symmetrical.

In an ideal system, where all grid response is provided by devices controlled according to the present invention, frequency excursions will not end until energy borrowings have been repaid. If the response to grid frequencies comes from other sources as well, (i.e. by generators), the excursion may end before borrowings have been fully repaid, but the loads will nonetheless retrieve the energy required to replenish their energy store.

The central frequency, derived from a moving average of the frequency is the frequency above which the overall load derived from devices controlled according to the present invention will increase, and below which the load will decrease. This is, effectively, a target frequency for the whole system. It could be that a system target frequency different from this could be further derived. The possibility is to move the system target frequency closer to the nominal frequency, so as to provide some bias to influence the grid frequency towards nominal.

Below is described, in further detail, a complete procedure for obtaining the triggering frequency for a particular control device.

First, the central frequency is calculated. Each reading from the first recorded frequency reading since the current excursion above or below nominal began is taken into account. The obtained central frequency may then be further manipulated to bias it towards the nominal frequency, but this may not be necessary since such a bias is an inherent feature of the control devices of the present invention.

A device base or target frequency is then determined. To do this, a range within which the base frequency is to be placed is determined and then a random target frequency is chosen within this range. Each device has both a high target frequency and a low target frequency, which are preferably provided from separate random values called the low random value and the high random value. The high target frequency is for a high frequency excursion and the low target frequency is for a low frequency excursion.

When choosing the random number which distributes the target frequency between the nominal and low limit or high limit of the permissible frequency range, it is preferred that one random number is used for high frequency excursions, and another random number is used for low frequency excursions. The random numbers are preferably provided between 0 and 1 so that the target frequency can be positioned anywhere between the full range (as defined above) of possible frequencies. It is preferred that the two random numbers are regenerated after an opposite excursion begins.

Thus, the low frequency excursion random number is chosen at the start of the high frequency excursion and the high frequency excursion random number is chosen at the start of a low frequency excursion, thereby ensuring the readiness of the random number upon a frequency excursion changeover.

It is important to regenerate the random numbers at regular intervals, as the sensitivity to grid frequency changes for a particular control device depending upon the random number. As will become clearer below, a refrigerator with small random numbers will tend to carry a greater switching burden than one with larger random numbers. This is because the target frequency generated from a large random number will be more likely to provide a triggering frequency closer to the outer frequency limits, which are more rarely realized by the grid, than frequencies closer to the nominal frequency of the grid.

It is also important that the random number is not regenerated during a particular excursion. This could result in an unpredictable impact upon the grid stability. Other strategies are possible, however. For example, the random numbers may be generated during a first change following a 24 hour period or other such chosen period.

There are four possible ranges within which the target frequencies should be provided:

(1) The grid is in a low frequency excursion (central frequency below nominal) condition and the load is currently on. This is shown in the left hand side of FIG. 3A. In this case, the target frequency is provided between a low frequency limit (the selection of the low frequency limit for the grid is discussed below) of the grid and the nominal grid frequency. Since the grid is currently in a low frequency excursion, the central frequency will also be provided between the nominal frequency and the above low frequency limit.

(2) In the case of a low frequency excursion when the load is off (FIG. 3A right hand side), the target frequency will be randomly positioned between a high frequency limit (the selection of the high frequency limit for the grid is discussed below) of the grid and the central frequency (different from the nominal frequency).

(3) In the case of a high frequency excursion (central frequency above nominal) and the load is off (FIG. 3B left), the target frequency is randomly provided between the high frequency limit and the nominal grid frequency.

(4) In the case of a high frequency excursion and the load is on (FIG. 3B right), the target frequency is provided between the low frequency and the central frequency value.

Figure 3A:
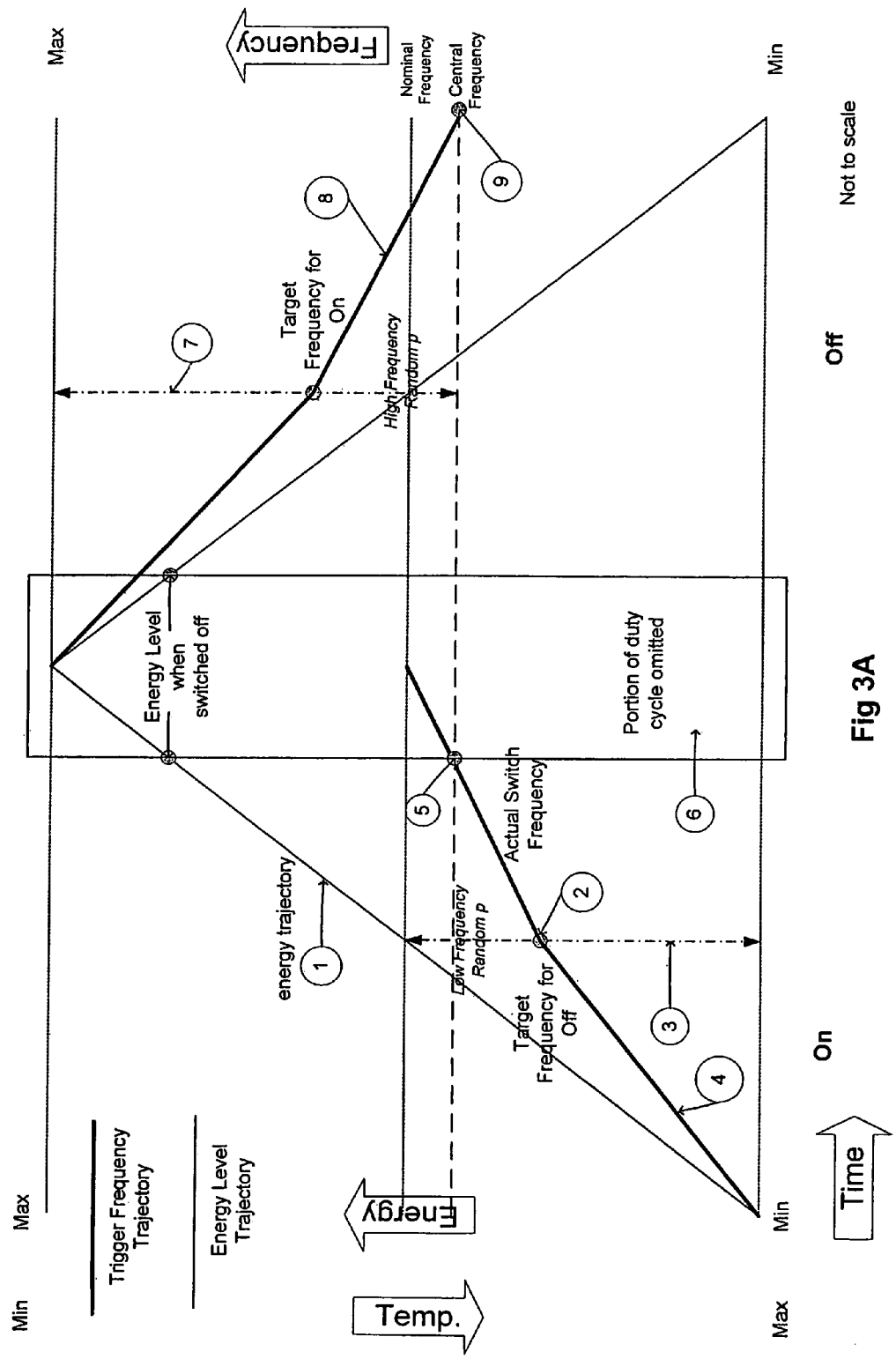
FIGS. 3A to 3B show an example of a profile of the trigger frequency function.
Figure 3B:
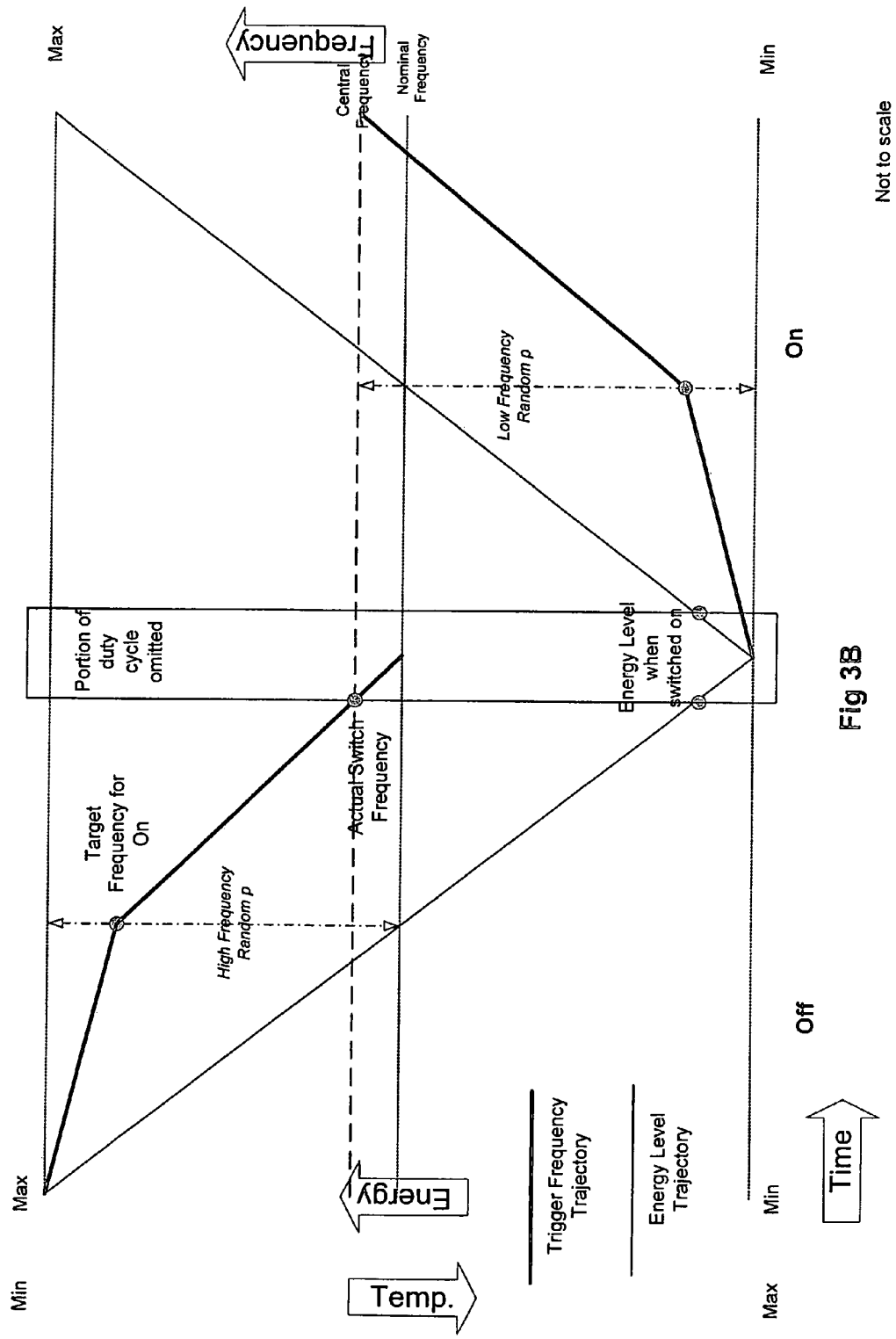

FIGS. 3A to 3B show example positions of the frequencies in each of these four possibilities. These figures also show the trigger frequencies, at which point the grid frequency will be such that it triggers a particular device off if it was already on or on if it was already off. FIGS. 3A to 3B show that the triggering frequencies are provided within the same range of frequencies provided for the random placement of the target frequency.

As shown in FIGS. 3A to 3B, the device target frequency is determinative of the form of the triggering frequency profile. Thus, the randomization of the target frequency is carried through to the triggering frequencies.

In the preferred implementation of the control device of the present invention, once the high or low target frequency has been calculated for a particular device, the devices specific trigger frequency needs to be calculated. When the device is on, only the low target frequency is relevant and when the device is off only the high target frequency is relevant. From the value of the particular target frequency, the form of the function can be derived. The function is different, not only depending on the target frequency for the device, but also on whether the device is on or off. From this function, using the current value of the sensed variable, the device's current triggering frequency can be obtained. This triggering frequency is then determinative of whether the device will switch on or off by comparing it to the sensed frequency.

The value of the triggering frequency shown in FIGS. 3A to 3B is calculated as outlined below. The proportion referred to below is a representation of how close the energy store is to being at its maximum or minimum depending on whether the device is on or off, respectively. The proportion is preferably ton or toff, the calculation of which is described above.

(1) If the proportion is less than 0.5, then
(i.e. is the time since the load switched last less than 50% of the time it takes to reach minimum or maximum)

(2) "Offset"=(the target frequency–"StartPoint")*the proportion
where the StartPoint is the low frequency limit for on devices and the high frequency limit for off devices. Thus, the (target frequency–StartPoint) is the difference between the high frequency limit or the low frequency limit and the target frequency. Since the proportion always runs between 0 and 0.5 (as per step (1)), this difference is made smaller by the proportion term. Thus, in this step, the value of the sensed variable is influencing the triggering frequency as is the target frequency.

(3) the trigger frequency=Startpoint+OffSet
thus, for on devices the trigger frequency is offset from low frequency limit and for off devices, the trigger frequency is offset from the high frequency limit.

(4) If the proportion is greater than or equal to 0.5, then
(i.e. is the time the device has been on or off more than half way towards its natural switching point? If so, then the load needs to operate in a higher probability switching zone than above).

(5) Offset=("Endpoint"–the target frequency)*the proportion
where the Endpoint is the central frequency for off devices during low excursions and for on devices during high excursions and is the nominal frequency for on devices during high excursions and off devices during low excursions. The offset is the difference between the target frequency and the endpoint, with the difference factored by the proportion. Since the proportion is always between 0.5 and 1, the offset is somewhere between being all or half of this difference. Again, this step shows that how long the device has been on or off and the target frequency both influence the value of the offset.

(6) the trigger frequency=the target frequency+Offset
thus, the trigger frequencies are provided between the target frequency and the central or the nominal frequency.

A load control device having the triggering profiles shown in FIG. 3A will now be described.

During a low frequency excursion, the central frequency is provided between the nominal and the low limit for the grid frequency, as shown in FIG. 3A. During such a low frequency excursion, the overall desired behavior is for on devices to tend to switch off in order to eventually bring the system frequency back towards nominal.

FIG. 3A shows the evolution of a load which is initially in an on state while the grid is in a low frequency excursion. The trajectory of the energy state 1 (left hand axis) shows it moving from a minimum energy state towards a maximum energy state. If no response is provided, the load will switch off at the maximum energy state from its limit setting, and the energy state will then move from the maximum to the minimum.

For each reading of the grid frequency and the physical variable associated with the load, the central frequency is recalculated. For clarity, the diagram shows a fixed central frequency, but it will actually vary with grid conditions.

While the device is on, the target frequency for off is then calculated using the low frequency random number 2. This will lie over the range 3 shown on the left of the diagram (FIG. 3A), which, in this state, is chosen to be between the low frequency limit and the nominal frequency. The physical variable associated with the load is then used to calculate the trigger frequency for off 4. The triggering frequency for on devices thus takes into account the new central frequency and the new sensed variable associated with the load. For on devices, when the grid frequency is below the target off frequency, then the load will be switched off. For off loads, when the measured grid frequency is greater than the triggered on frequency, then the load will switch on.

When the grid frequency becomes lower than the trigger frequency 5 the device will switch off, and the energy trajectory will change direction, even though the maximum energy store has not been reached. This has the effect of lowering the average energy stored in the device without changing the physical variable limits. In a large population of devices, this has the effect of raising the average temperature of the population of devices.

When the device has switched off, its further behavior is shown on the right hand side of FIG. 3A. The portion of the duty cycle that is missed 6 is shown hatched.

In this case the range over which the target on frequency is chosen lies between high frequency limit and the central frequency, and an example trajectory 8 of the trigger frequency for on is shown. If the central frequency stays unchanged, then the device will not switch on again 9 until the energy state has once again reached its minimum.

According to FIG. 3A, any movement of the measured grid frequency away from the nominal will result in loads being switched off. Clearly, the further the grid frequency is from nominal, the progressively greater number of devices that are switched off. Also, it can be seen that the further the sensed frequency is from nominal, the earlier the load will tend to be switched off during its on cycle.

According to FIG. 3A, any movement above the central frequency will tend to result in the off loads being switched on. Thus, the triggering frequencies provided by the present invention resist all grid frequency movements about the central frequency.

A similar discussion is applicable for high frequency excursions, as shown in FIG. 3B.

In a manipulation of the shown embodiments, all four of the ranges for provision of the target frequency, described above, could be provided between the central frequency and a maximum or minimum limit, rather than two of the ranges being between the grid nominal frequency and a high or low limit (as in FIGS. 3A to 3B). In this alternative form of the control device, FIG. 3A will be adjusted such that only decreases in the sensed frequency below the central frequency will result in loads being switched off (rather than decreases below central and increases above central up to the nominal frequency, as is shown). This will still provide the desired response, as a reduction of frequency means too much load and, therefore, devices switching off. Similarly, the profile of FIG. 3B could be modified so only increases above the central frequency will result in off devices coming on (rather than increases above central and decreases below central up to the nominal value, as is shown). Again, the response provided in this modified form is still as desired since a rise in frequency represents an increase in generation, which needs to be taken up by switching loads on.

According to FIG. 3A, during a low frequency excursion, if the current system frequency falls below a central frequency, then the off devices cannot switch on, since no triggering frequencies are provided below this point. The only way in which off devices will be switched on would be if the physical variable of a load reaches its lower limit. Thus, in the case of a decrease below the central frequency, response is only provided for on devices to switch off, as can be determined from FIG. 3A, which is exactly as required to compensate for the excess load causing the frequency drop.

Again with reference to FIG. 3B, during a rise in frequency above the central value, it is desired that off devices begin to switch on. This behavior is provided according to FIG. 3B. FIG. 3B also shows how devices approaching natural switching on points are favored by having their triggering frequencies closest to the central frequency. The figure also shows how the triggering frequencies of the population of the off devices are spread between the central frequency and the high frequency limit so as to provide progressive response behavior.

There is the possibility that the frequency of the grid will repeatedly move up and down within a narrow frequency range close to the central frequency. In these circumstances the population of devices sensitive to the experienced frequencies will become depleted. That is, when the frequency falls, the most sensitive devices will switch off, and when it rises the most sensitive devices will switch on. The devices that switch in this way will become unavailable for providing further response until they have completed the remainder of their cycle. In due course, the population of sensitive devices will be restored as devices approach the state in their cycle, which may be shorted by the response it provides, where they are again willing to switch.

The rate at which a depleted frequency zone is replenished is influenced by the range over which the target frequency is chosen. Including the frequency zone that is depleted of sensitive devices into the target frequency range, increases the rate at which depleted zone is replenished from the population of devices that are approaching sensitive points.

The increased replenishment is achieved by spreading the depletion across a wider frequency range, which is not currently being experienced on the grid. While this does reduce the total response still available, this properly reflects the physical fact of using up the finite response provided by the population of fridges.

Although it appears that there is a zone between the Nominal frequency and the central frequency where the action of on devices and the action of off devices appear to overlap and so negate each other, in practice, these actions will not in fact take place at the same time, but are separated by the time taken for the grid frequency to change direction and serve to damp small and up and down frequency changes.

The degree of Response available as the grid frequency passes through a depleted zone will be less, so the change in load available to slow the change in frequency will tend to be less. This tendency makes the frequency a more accurate indicator of the extent to which energy has been loaded to or borrowed by the fridge population and is the intended desired behavior.

As can be seen from FIG. 3A, when the sensed grid frequency increases above the central frequency, off devices come on according to FIG. 3A. Only if the frequency then again decreases will on devices turn off as there remains a population of devices with the trigger off frequencies between the central frequency and the nominal frequency. This means that while movements of the grid frequency below the central frequency will result in only on devices being switched off (excluding off devices reaching their minimum limits of the physical variable associated with the load), the response for the grid frequency moving above the central frequency is provided by off devices switching on, as desired to stabilize the grid frequency movements.

A similar discussion to the one given above concerning low frequency excursions with regard to FIG. 3B, is symmetrically applicable to a high frequency excursion (above nominal) of the central frequency.

In a real grid, changing between high and low excursions as the load and generation varies, the population of fridges in each state will be dynamic and the behavior of individuals fridges less determined than in these descriptions.

The maximum and minimum frequency limits are used by the control device for determining the ranges over which the target and triggering frequencies should be spread. These frequency limits can be determined by experience over time of the frequency behavior of the grid or can be set at installation depending upon the grid with which it is intended to be used.

For example, in the US, the grid frequency is intended to be kept within plus and minus 0.5% of the nominal grid frequency, i.e. the grid frequency should always fall between 59.7 hertz and 60.3 hertz. This would be the default value for a control device intended to be operated on the US grid. These default values could be set or could be self-optimizing based on the device's experience with the grid. The possibility of a self-optimizing control device for providing these frequency limits will now be discussed.

The control device of the present invention will be preferably provided with a default set of parameters related to the grid with which it is expected to be used. As can be seen from FIGS. 3A to 3B, if the grid frequency passes outside the maximum or minimum range, the entire population of devices will be in the same switched state, i.e. either off or on. No further grid response is available from the load. Thus, it is important to perform a self-tuning of the frequency limits correctly and carefully.

Ideally, the frequency control limits are chosen to lie just beyond the frequency deviation tolerable by the grid. It is also, however, desirable to keep the rate at which the grid frequency varies fairly low. The method adopted by the grid responsive control device of the present invention is to balance these requirements to monitor the frequency extremes experienced, and to use these to adjust the frequency limits stored. Two core adjustment processes are used.

First, if the extreme frequency experienced during an excursion is greater than the limit used, then, in subsequent excursions, the extreme will become the new limit. So on a grid with big variations, the grid responsive control device will adjust to distribute its service across the full range of frequencies experienced. The grid responsive control device has the capacity to analyze the events leading up to the extreme, and can use this to moderate the extent to which the limits are widened.

In the second process, if the extreme frequency experienced within a period is less than the currently stored frequency limits then the frequency limits will be adjusted to be closer to the frequency extremes experienced. The responsive control device will, however, only bring the limits closer by a small proportion of the difference between the extremes and the limits (a moving average technique). In this way, it will take numerous cycles of adjustment before the frequency limits become significantly narrower. The tendency for the limits to narrow could also be countered by ignoring all excursions outside the stored frequency limits that are shorter than a defined period (for example in minutes).

So, if the device experiences more extreme frequencies than its defaults lead it to expect, it will rapidly widen its behavior to suit the circumstances. If, on the other hand, the grid is more stable than the defaults lead it to expect, it will only slowly migrate towards narrower limits, and will still react quickly if the grid behavior again becomes more volatile.

Further, the limits are provided with a margin, a so-called rare event margin, such that the grid responsive control device will assume that the biggest frequency excursion is not rare, and so the frequency limits actually chosen are adjusted to provide spare capacity proportionate to the rare event margin. The rare event margin could be provided, at manufacture, in two ways.

The rare event margin could be set to be less than unity meaning that grid response behavior will not be possible whilst normal extremes of the network are experienced. This is because the rare event margin will define the control device's frequency limits to lie within the grid's frequency extremes. In a grid where grid responsive behavior is predominantly provided by fossil fuel plants and not by the loads, substantial emissions benefits can be achieved with a rare event margin of less than unity.

Alternatively, the rare event margin may also be set to greater than unity. Thus, the grid responsive control device will tune itself so that even during grid extremes, there is a margin for exceptional events. This mode is essential when the grid responsive control devices of the present invention are the predominant provider of grid responsive behavior, as some responsive behavior in all grid circumstances will be needed.

Thus, the rare event margin of less than one will be used at the early stages of implementation of the grid responsive control device and as the population grows, a rare event margin of greater than unity will become the normal standard.

The emissions benefit of having a rare event margin of less than one arises because providing response at the load end will not have any impact on emissions, whether of carbon dioxide or other pollutants. This is in contrast to providing response at the electricity supply end, where the generation plant will have to be operated at less than capacity and be able to operate with frequent dynamic changes (making efficiency and pollution control harder).

In order to conclude when an extreme frequency or rare event has occurred, the grid responsive control device of the present invention needs some definition of "rare" to use. Extreme grid events include a failed generation plant or a failed important transmission line. Such an event is most unlikely to happen any more than extremely infrequently and it is the sort of event that the rare event margin of greater than one is intended to cover. On the other hand, if a transient peak load occurs, such as a TV break in winter, is not covered by the extreme frequency limits, then the limits should usefully be adjusted to cover such an event, which is an indication of grid stress, but not a rare failure.

It may also be worth considering having different frequency control limits for different various periods within a day or a week (many grids use half hours as metering boundaries, and this may be useful here). The range of the limits may be wider at times when the demand is changing rapidly, as indicated by the stress status function (h) defined earlier. Minimum demand times or a low stress state of the grid could have a narrowed range of frequency control limits. The times during a day when the grid is most likely to be stressed could be learned from experience with the grid and the intervals at which the frequency control limits need to be widened could be timed by the control device. Since, however, the control device will not have access to an external clock, this tuning will need to be discarded whenever the power is switched off.

In overview, the present invention provides a grid frequency response control device that minimizes switching of loads, resists all changes of frequency about a historical moving average of the current frequency and biases the system frequency towards nominal to some extent. Thus, the grid is stabilized and overworking of the loads is prevented. A clear frequency signal is also provided that is less noisy, is smoother and which is gradually and continuously biased towards an ideal nominal frequency of the grid.

In the above, switching the energy consumption of the load between on and off states is performed by directly controlling the energy consuming device of the load. However, an alternative implementation of the present invention is to adjust the set point or the central limits of the parameter of the load. In this way, the load will adjust its energy consumption to keep the sensed variable of the load within the control limits.

In the example of a refrigerator, when the frequency sensed is such that the refrigerator should switch on, the control limits can be shifted below the present value of the temperature of the refrigerator's cooling space. This, the control mechanism of the refrigerator will detect that the temperature is too high and respond by switching the cooling means of the refrigerator into an on state. The opposite direction of moving the control limits can be performed when the frequency is sensed as being such that the refrigerator should switch off.

Instead of adjusting the control limits, the set point itself can be adjusted by the control device of the present invention. The control mechanism of the load will receive the new set point and derive the control limits itself.

The control device controlling the setpoint or the control limits in this way may be advantageous. Such a control device will not need to be integrated into the control circuitry of the load so as to be able to directly communicate with the energy consuming means of the load. Instead, it merely needs to provide a central signal to the control circuitry of the load and the varying of the energy consumption is performed in the normal way.

We have up to yet discussed preferred embodiments where grid responsive control is performed by switching the energy consumption either on or off. Some loads, however, control a physical variable of the load within control limits by adjusting the level of energy consumption. Thus, the load may be controlled between a first state of increasing the energy stored by the load and a second state of decreasing the energy stored by the load, as has previously been discussed. Below is described an example implementation of the control device of the present invention with a refrigerator using such continuous control of the energy consumption to maintain the temperature of the cooled space within control limits.

A pure temperature controller will likely aim to become a classic three term controller, with parameters influencing the extent to which variations from the set point influence the power. Classically, these are Proportionate error (how big is the error now); the Integral error (accumulating smaller error over time), and the Derivative error (so that, if the error is reducing rapidly its overshoot is minimized). This is known as the physical PID controller, although the control may, in fact, not include all three terms and so be simpler than this.

Figure 6:
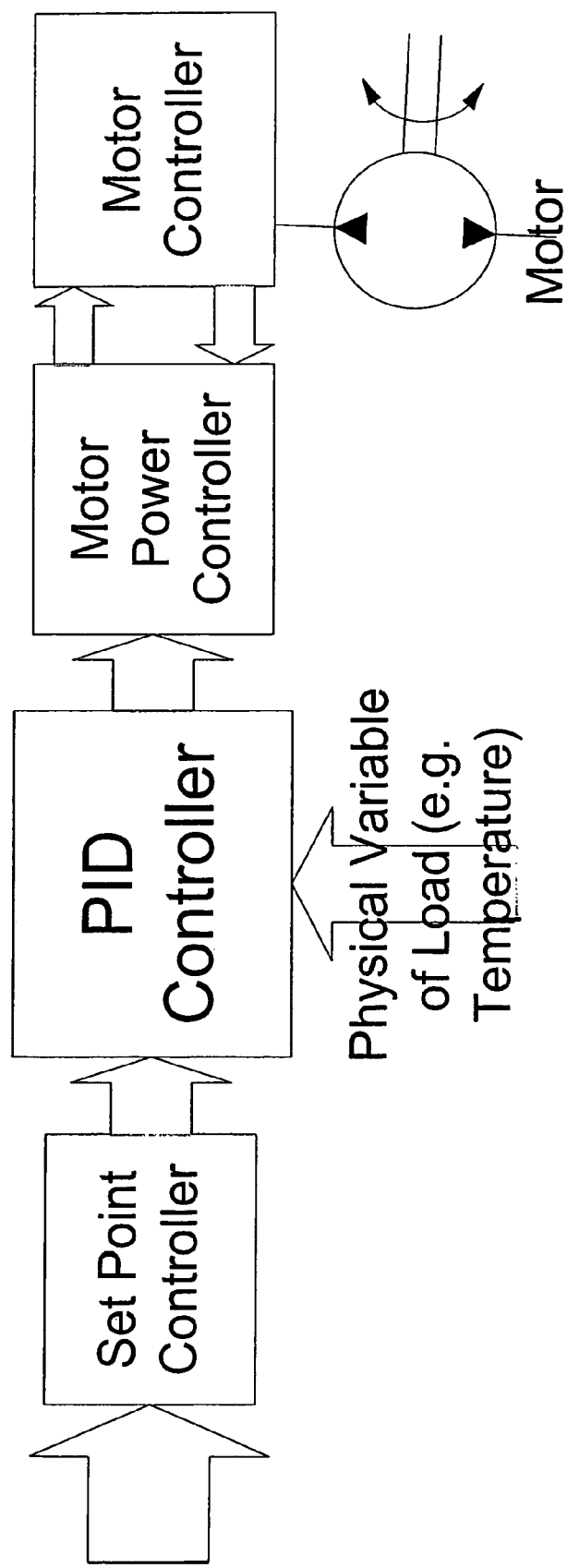
FIG. 6 shows a block diagram broadly outlining the operation of a PID controlled load.

In general, the PID controller actually drives a motor power controller, which in turn drives the power electronics of the motor controller that actually drives the motor or load. FIG. 6 gives further detail:

The Manual Controller provides input to a Set Point Controller that provides the set point signal to the PID controller in a suitable form. The PID controller also has as input the current state of the variable being controlled, so, in a fridge, for example, this would be the temperature.

The output from the PID controller is a desired motor power level. This is the power level considered appropriate to keep the controlled variable at its set point.

This desired power level is often used by a further controller to make adjustments to the actual power flowing to the motor, as the rate of change of the actual power may be slower than the rate at which the desired set point can change. So a further feedback control may be implemented to ensure that the (electronic) motor controller is set as accurately as possible.

Two methods are described by which the desired grid responsive services of the control device of the present invention can be enabled in such a load. In a particular implementation either or both may be used.

A set point modification approach, as described above, influences the power consumed by the device by modifying the set point or control limits used by the PID controller to make its control decisions. So that, in a fridge, the lower the frequency, the lower the temperature set point (i.e. increased energy stored), and the higher the frequency, the higher the temperature set point (i.e. decreased energy stored). More generally, the lower the frequency, the higher the internal energy stored, as indicated by the Physical Variable of the Load, that the device aims to achieve.

Figure 6A:
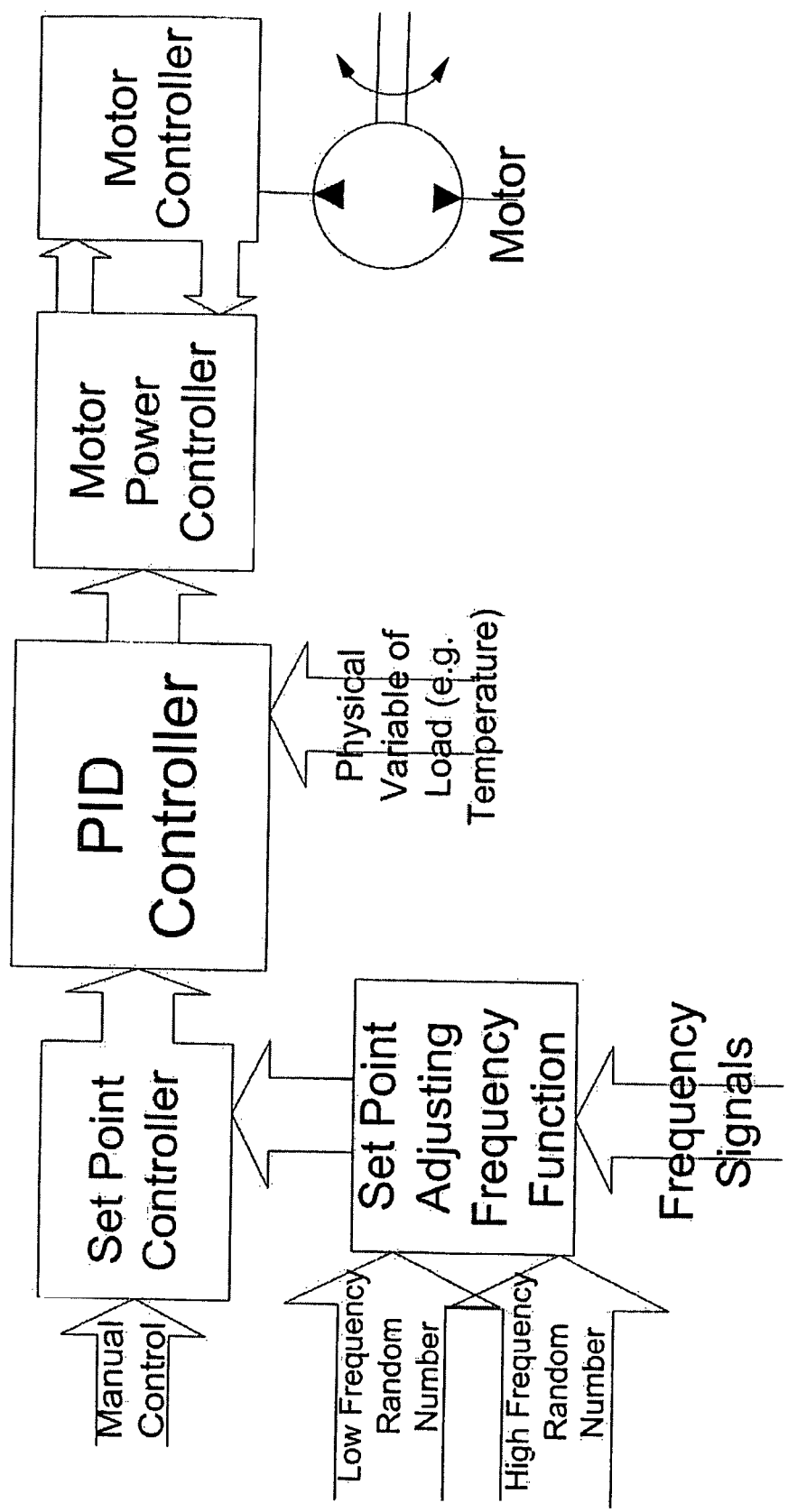
FIG. 6A shows a block diagram broadly outlining the operation of a set point adjusting grid responsive control device for a PID controlled load.

FIG. 6A shows a block diagram outlining the proposed control device. As for a conventional controller, a manual input is used to define the normal set point for the PID. For this controller, this sets the target internal energy level that will apply when the actual frequency is the same as the central frequency. That is, it will apply when no further control over the frequency is necessary.

In this controller, a Set Point Adjusting Frequency Function feeds an adjustment to the Set Point Controller. This signal is scaled such that: when it is at its maximum positive value, the internal energy level set point is set to the highest permitted value; when it is zero, the internal energy level set point is set to the manual control; and when it is at its maximum negative value the energy level set point is set to the lowest permitted value.

The Set Point Adjusting Frequency Function has two inputs:
 1. The central frequency, derived as described above.
 2. The current value of the sensed frequency.

At its simplest, the Set Point Adjusting Frequency Function may operate by comparing the two frequencies, multiplying this by a parameter, and feeding the result as input to the Set Point Controller.

A flaw in this simple approach concerns the possibility that, if the parameters of the PID and the function (or simple multiplier) to relate the frequency change to the change in set point were not specifically tuned for the specific circumstances of the specific grid, then there is the possibility that the population of fridges will over or underestimate the change on output necessary to achieve stability. In correcting this change, the devices could cause the frequency to oscillate.

Such oscillation (which arises from loss of what is known as Small Signal Stability) does sometimes occur in existing grids, and, if not detected early and corrected, can have severe consequences. When detected, the normal method of correction is to reconfigure the grid and generation so the particular frequency of oscillation is no longer resonant (a fairly hit and miss approach). It can also be resolved by returning some of the controllers of the large gensets that participate in the oscillation. Analyzing grids to detecting and correct and returning control is demanding of information and computational capability.

However, future grids, with very large numbers of grid responsive control devices according to the present invention, cannot so easily be deliberately reconfigured (it can happen accidentally as the oscillations trigger failures!)

Hence it is important to include in the automatic control system an element of diversity in the sensitivity of response among the population of devices. With such diversity, there is a smooth progression of response from the most sensitive devices to the least, so making the change in load monotonic with increasing departure from nominal frequency.

The achievement of this diversity is described below by incorporating a probability element to the set point control.

The controller uses two random numbers, chosen as described above, one for low frequency, and one for high frequency.

If the current frequency is below the central frequency, then the set point adjusting function will:

1. Derive a negative value of the frequency difference (e.g. by current frequency−central frequency).
2. Make this value proportionate to the range over which the controller will operate (Minimum frequency to Nominal frequency)
3. Multiply this value by the low frequency random number.
4. Multiply the result by a sensitivity parameter defining the sensitivity of the system.
5. Feed the result to the Set Point controller, which will use this to adjust the set point and reduce the energy level it seeks.

If the actual frequency is above the central frequency, the procedure is similar, but uses the high frequency random number, and may use a different sensitivity parameter.

The sensitivity parameter will be set in the light of expected grid behavior, and may be adjusted in the light of the experience of the device in use.

An alternative to set point modification for a PID controller is an output responsive PID controller which controller adjusts the normal output of the PID controller to modify the actual energy consumed by the device according to the frequency.

Figure 6B:
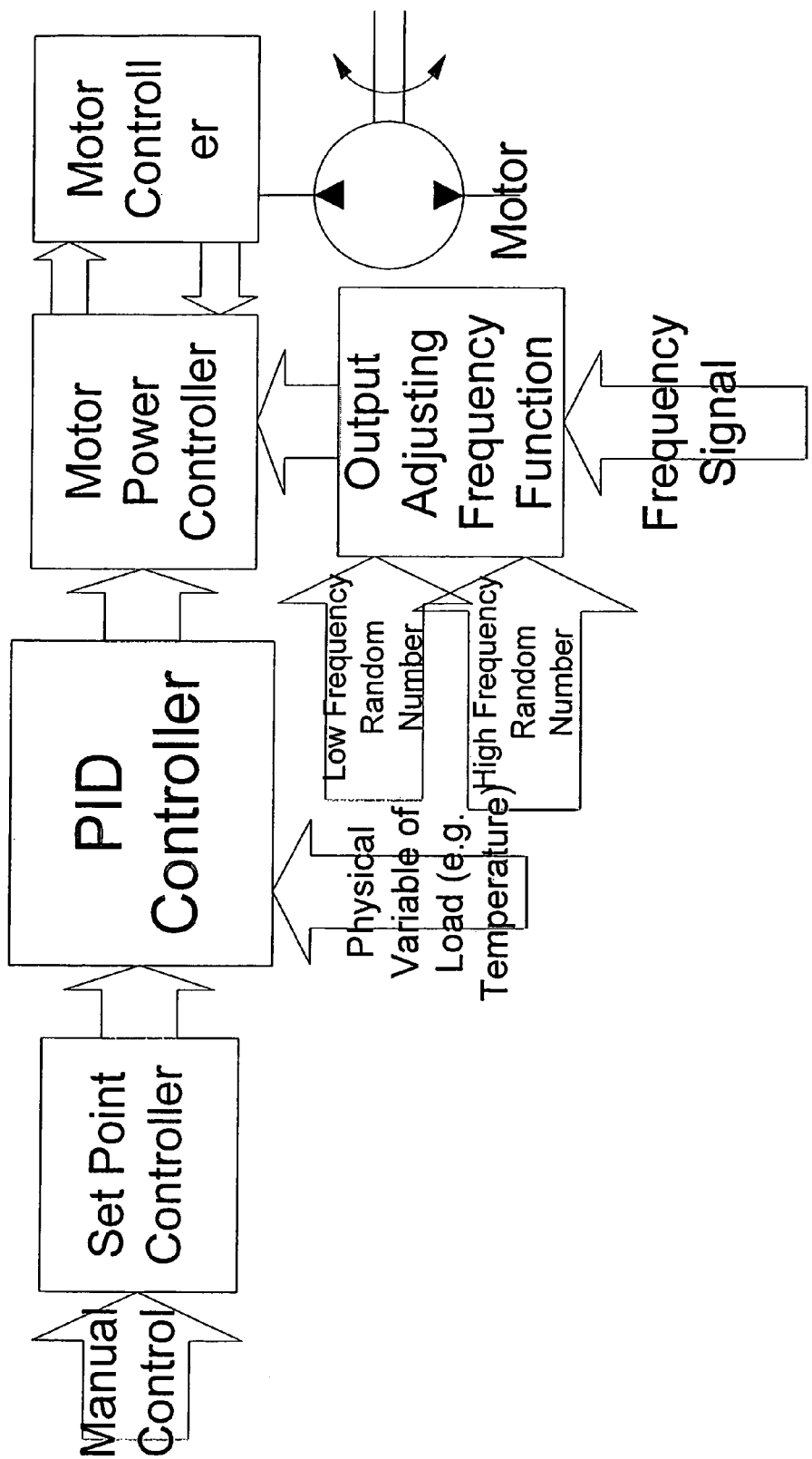
FIG. 6B shows a block diagram broadly outlining the operation of a motor power adjusting grid responsive control device for a PID controlled load.
Figure 7:
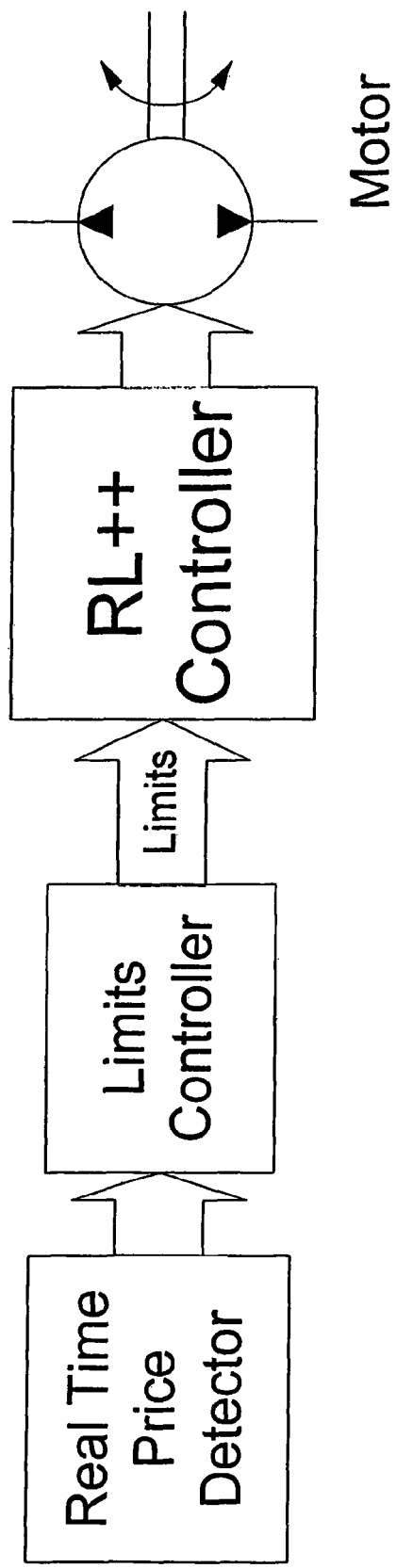
FIG. 7 discloses a grid responsive controlling operating with a price as an indicator of the balance between load and generation on the grid.

With reference to FIG. 6B, the output of the PID controller is used by the motor power controller to increase or reduce the power consumed by the motor.

If the central frequency is the same as the actual frequency, the behavior of the motor power controller continues to function as normal to keep the control variable within the central limits.

FIG. 6B shows a block diagram outlining the operation of such a control device for use with a PID controlled load.

If the central frequency and the actual frequency are different, then the increase or reduction in the power level of the motor is modified by the signal from an output adjusting frequency function. With both these signals normalized to reflect the range over which the devices operate, the four possible control actions are each discussed:

1. If the PID controller signal is for an increase in the motor power level, and the actual frequency is above that of the central frequency. The desired of both control signals are in the same direction. In this case the output adjusting frequency function will enlarge the increase in power level sought by the PID controller. The calculation will be:

adjusted power output level increase=PID output power level increase+(PID output power level increase*high frequency random number*high frequency increase parameter*(actual frequency−central frequency)).

2. If the PID controller signal is for an increase in the motor power level and the actual frequency is below that of the central frequency. In this case the desires of the two control signals are in conflict. In this case the output adjusting frequency function will reduce the increase in power level sought by the PID controller. The calculation will be:

adjusted power output level increase=PID output power level increase−(PID output power level increase*low frequency random number*low frequency reduction parameter*(central frequency−actual frequency)).

3. If the PID controller signal is for a reduction in the motor power level, and the actual frequency is below the central frequency. The desires of both control signals are in the same direction. In this case the adjusted output adjusting frequency function will enlarge the increase in power level sought by the PID controller. The calculation will be:

adjusted power output level reduction=PID output power level reduction+(PID output power level reduction*low frequency random number*low frequency reduction parameter*(actual frequency−central frequency)).

4. The PID controller signal is for a reduction in the motor power level, and the actual frequency is above the central frequency. In this case the desires of the two control signals are in conflict. In this case the adjusted output adjusting frequency function will reduce the reduction in power level sought by the PID controller. The calculation will be:

adjusted power output level reduction=PID output power level reduction−(PID output power level reduction*high frequency random number*high frequency reduction parameter*(central frequency−actual frequency)).

The four parameters: high frequency increase parameter, low frequency increase parameter, low frequency reduction parameter, and high frequency reduction parameter are set in the light of the desired grid response, and may be adjusted by the controller in the light of actual grid experience.

There are many examples of loads having intermittent or variable energy consumption in order to control a variable within central limits. Further, there are many devices that can benefit if they operate to longer term cycles than those discussed up to now. One example from the water industry is that of "reservoir profiling". This is used when there are, for example, water reservoirs that have capacity to meet their needs for a period of a day or so, or for long enough to span at least one "off-peak" pricing period.

In such circumstances, it is possible to let the reservoir empty below the preferred level when demand for electricity is high, and replenish it when the cost of electricity is lower. So, for example, during the morning peak demand period of electricity, which also corresponds to the morning peak period for water demand, cost savings are possible by postponing the replenishment of the reservoir until electricity demand is lower.

Yet the intermittent nature of reservoir replenishment makes it an ideal candidate for use with a grid responsive control device.

The present example control device makes use of a price parameter to provide grid responsive control. The current price of electricity is, like frequency, also representative of the balance of generation and load on the grid.

The detection and use of a real time electricity price is discussed in GB 2407947.

The price is then used within a central limits or set point controller to adjust the central limits of the physical variable f the load.

The principle is that, as the price rises, the limits (or set point) for the internal energy store are lowered, and, as the price falls, the limits (or set point) for the internal energy store are raised.

A simple, proportionate control, with the limits chosen to be proportionate to price is used.

A refinement of this is to have the price modify the "rate of change" of the limits. So that, if the price is high, or above a threshold set by those you pay, then the rate at which the limits (of internal energy) are reduced is increased. The limits are prevented from passing extremes set by operational and safety requirements.

Similarly, if the price is low, or below a threshold set by those who pay it, then the rate at which the limits (of internal energy) are increased is itself increased.

The ideal tuning for this is to enable a population of such loads to be able to provide some of both high frequency and low frequency response at all times, but also to benefit from the longer term storage by minimizing the cost of the electricity.

The present invention also provides a black start assistance feature, which allows the energy store loads to provide grid responsive behavior during black starts, after a blackout has occurred. As previously mentioned, the grid is particularly sensitive at this time and the provision of grid frequency response loads is necessary to ensure grid stabilization at this most important of points and also to speed up the recovery of the grid.

Thus, in accordance with a fifth aspect, the present invention provides a control device for controlling an energy consumption of a load on an electricity grid, said control device comprising:

means for delaying the starting of energy consumption of said load by a randomly generated amount of time after power is initially provided to the control device.

A corresponding method for the fifth aspect is provided in a sixth aspect of the present invention.

In accordance with a seventh aspect, the present invention provides a control device for controlling an energy consumption of a load on an electricity grid to maintain a physical variable of the load within upper and lower limits, said control device comprising:

means for sensing the physical variable of the load;
means for providing the upper and lower limits of the sensed physical variable of the load; and
means for increasing the upper and/or lower limit of the sensed physical variable at a rate less than a maximum energy consumption of the load after power is initially provided to the control device.

A corresponding method for the seventh aspect is provided by an eighth aspect of the present invention.

The features of the aspects of the invention associated with the black start mode are combinable to provide a particularly advantageous control device. They may be used with grid responsive control devices of the prior art or with the grid responsive control devise hereinbefore described and, particularly combinable with the previously set-out aspects and preferred aspects of the invention. The black start assistance (BSA) aspects of the invention will now be described in more detail.

When a load is powered off, this could be due to a power cut or blackout. The control device of the present invention is adapted to recognize this possibility.

In such circumstances the grid may be delicate, and it is desirable for the device: 1), to start providing both high and low frequency response as soon as possible; 2), to avoid behavior synchronized with other grid responsive control devices; and 3), to re-establish the sensed physical variable of the energy store load within its maximum and minimum limits. Since, however, a blackout could already have moved the sensed physical variable for the load outside of its control limits, a slight delay of the time to re-establish the load into its preferred operating range will generally have a lower priority than keeping the recovering grid stable.

The control device of the present invention offers a Black Start Assistance (BSA) mode upon power up to aid a recovering grid during reconnection of load.

In one aspect of the BSA mode, the grid responsive control device determines a random delay before starting. This delay is both to prevent a peak load arising upon restoration of power, due to all the loads switching on as soon as the cut portion of the grid is reconnected, and to minimize the synchronization (maximize the diversity) of the control devices as soon as possible. The random delay in starting-up after re-connection in black start mode provides a gradual increase in load on the grid after blackout.

Upon re-connection, a conventional refrigerator will set a 100 percent on duty cycle for the energy store load until the sensed physical variable of the load reaches its maximum control limit (ymax) and will then shut-off immediately. In a second advantageous aspect of the present invention, however, response is provided by the load even when the load is being operated at an accelerated rate to re-establish the load within its preferred operating parameters.

According to this second advantageous aspect of BSA, the load is ramped up to its proper operating condition, i.e. when the sensed physical variable is within the load's control limits for the variable, with some duty cycle maintained. The provision of a duty cycle during this ramping up process allows some response to be provided, thereby aiding black start. In order to accelerate the load to its proper operating condition, the energy store load's limits for the sensed physical variable must be increased. Thus, the duty cycle is adapted such that the device will operate to a longer on portion than for normal operation. The load is controlled, though, so it does still retain a duty cycle. One example method for achieving this is as follows.

The first step is to choose a time over which the device will reach its proper operation. This would be some factor (greater than 1) of the time that the load would reach this proper operation if it was not interrupted. This factor will provide periods of no load during the black start process. In this way, the load can both switch off in light of a low frequency and on in light of a high frequency. Thus, the load is able to provide response during the ramping up of the load's control limits. This factor could, for example, be the ratio of the expected overall cycle time of the load to the expected on portion of that cycle.

In the case of a refrigerator currently at ambient temperature because of a recent blackout, the normal, 100 percent on duty cycle time for reaching its maximum temperature limits, say 0 degrees Celsius, could be 30 minutes. Using a factor of two, the time for increasing the load to its normal operating temperature range will be 60 minutes.

The factor chosen can be altered by a randomization function to encourage further diversification of the load control devices.

The next step is to assess the expected on time for restoration of normal operation. One way to estimate this is to extrapolate from the normal temperature change for a unit of on time of the load to determine how long the load will need to be on starting from the current energy store level. If necessary, this estimation of the expected on time can be made more sophisticated than a linear extrapolation.

A rate of change of the target energy store level in view of how long the device will need to be on for and in view of the period chosen for restoration to the desired level can then be determined.

After the random delay has passed, the low energy limit is set to the current value of the sensed variable and the upper energy limit is defined to be a normal amount of offset from the lower limit. The load is started and moved to normal grid responsive operation.

The limits are incremented according to the chosen rate of change of the energy store level.

An overview of the operation of the grid responsive behavior incorporating preferred embodiments of all aspects of the invention in a single system combined, with reference to FIGS. 4 and 5 will now be given.

Figure 5:
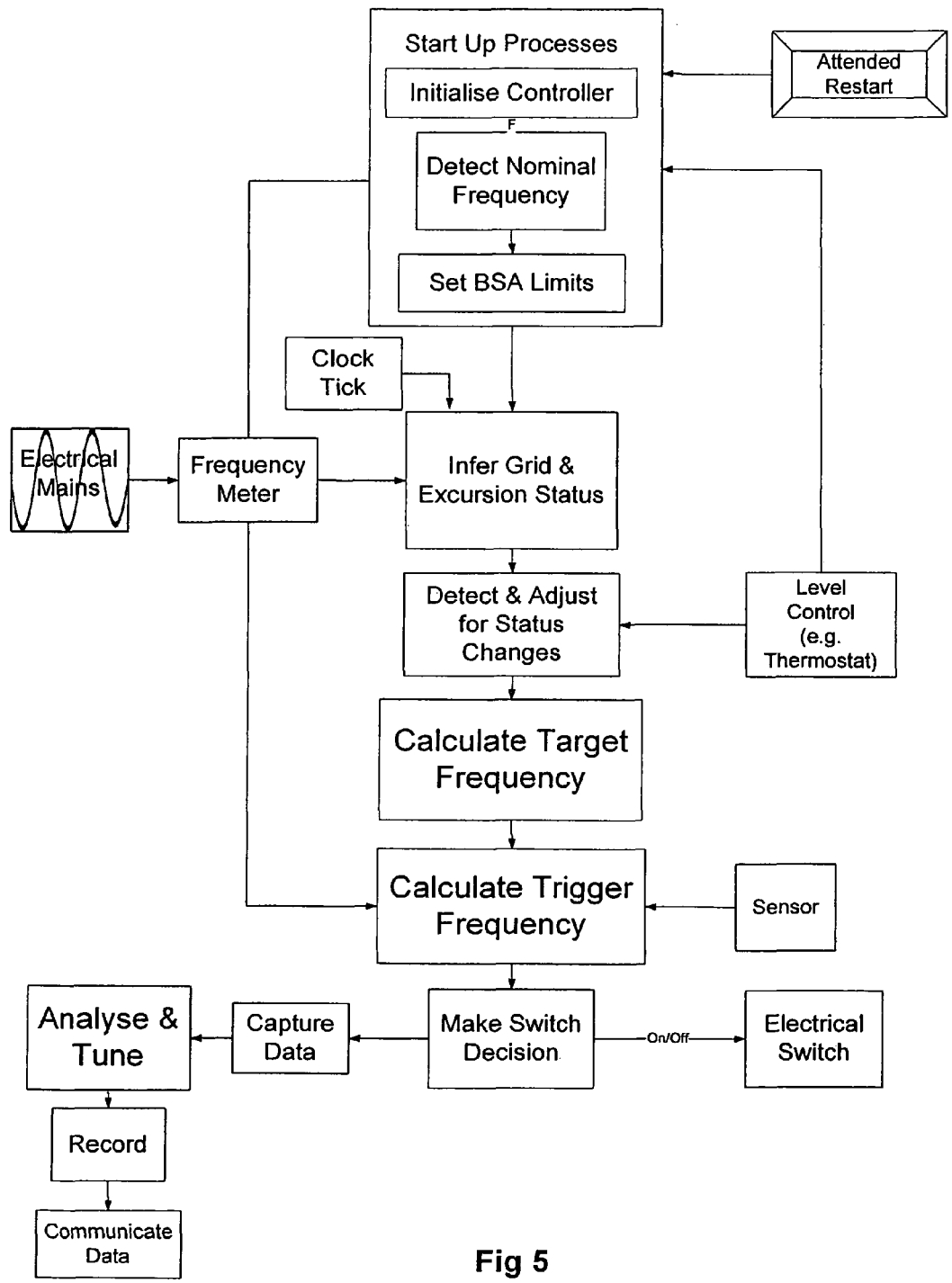
FIG. 5 shows a block diagram of the preferred operation of the responsive control device of the present invention.

As shown in FIG. 5, the grid responsive controller is preferably integrated with a load for drawing energy from the grid. When the load is first plugged into or connected to the grid, the responsive load control device is adapted to determine the current frequency of the grid. This frequency measurement is performed periodically based upon a central processor clock cycle or some other processing cycle of the responsive control device, or a predetermined number of such cycles. These consecutive frequency readings will be accumulated so as to calculate the central frequency of the grid, amongst other uses, and are critical to the operation of the grid responsive control device of the present invention. Apart from the frequency measurement, the grid responsive control device also requires a physical variable to be sensed from the load.

Figure 4:
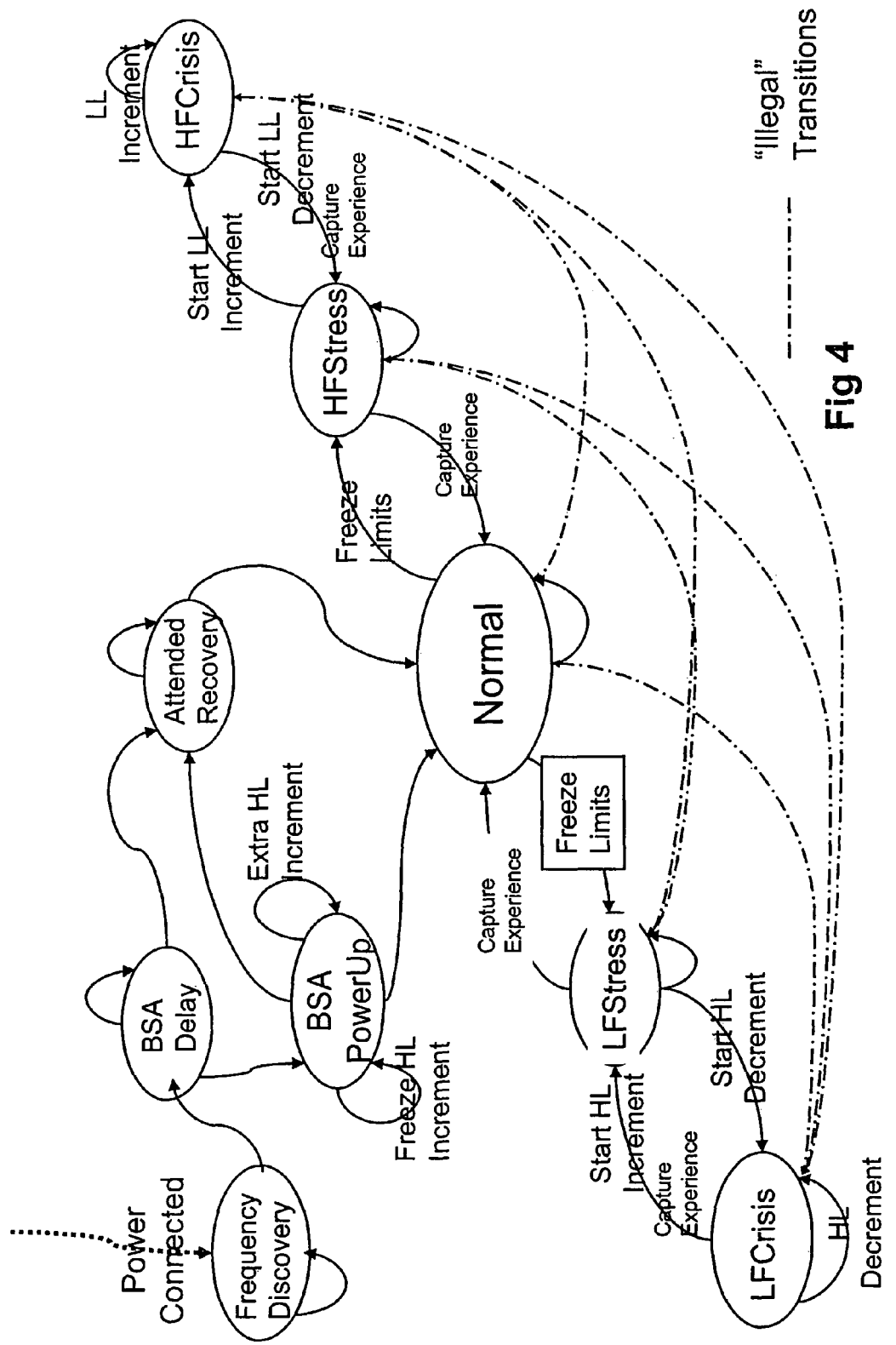
FIG. 4 shows an overview of the various states of a preferred responsive control device.

FIG. 4 shows a representation of various states and state transitions in which the responsive control device can operate. As can be seen from FIG. 4, the grid responsive control device preferably starts up in a black start assistance mode, as described above. In this way, all the loads recently connected to the grid will provide grid responsive behavior from the beginning, which, as already described above, is especially useful after a blackout.

As part of the black start assistance features offered by the present invention, the control device could be provided with an attended restart actuator (as shown in FIG. 5), which results in the sensed variable of the load being brought within normal control limits as soon as possible if actuated. Thus, if the attended restart control is activated, then the black start assistance mode is overridden and the load is operated at maximum energy consumption until the sensed physical variable is provided within its control limits. This feature is useful as often the load is simply being switched on for the first time or perhaps after being serviced. In these circumstances, the grid is relatively stable and on devices being operated without response for a brief period during start-up is inconsequential in terms of grid stability.

The attended restart actuator could be a button provided on the load. The button should be fitted where a service engineer would be aware of it, but where it would be inconvenient for a technically aware load owner to press. If the button was such that many load owners were aware of the attended restart button, then the black start assistance function of the grid responsive control device of the present invention could be overridden.

Once the sensed variable of the load is within its specified control limits, the state of the grid will be determined, so as to derive the mode of operation for the control device. The state of the grid is determined from the h function defined above and a measured grid frequency as shown in FIG. 5. As previously stated and as shown in FIG. 4, the grid can be in a high or low crisis state, a high or low frequency stress state or a normal state, depending on the value of the function h.

A general principle of the responsive control device of the present invention is that the maximum and minimum limits for the sensed physical variable (ymax, ymin) is dependent upon the mode of operation of the control device, as outlined below.

During black start assistance mode, the current limits for the sensed physical variable are set around the value of the sensed physical variable measured upon initial power-up of the load. This setting of the initial Black Start Assistance limits for the physical variable is shown in FIG. 5. These limits are incremented at a predetermined rate until the normal limits for proper operation of the load are reached, as described more fully above. It is an advantageous feature of the invention that the predetermined rate of limit increment provides for the device to have some duty cycle. Having a duty cycle will allow the load to provide response, rather than the alternative of having the load continuously on.

The increment of the limits during BSA mode is always performed unless: a period of low frequency stress or crisis is determined, in which case the limits are frozen; or a period of high frequency stress or crisis is determined when the rate of increment is increased. During a low frequency stress or crisis state, there is too much load on the grid, and so continuing to increase the energy consumption of the responsive loads is not appropriate. During a high frequency stress or crisis state, there is too much generation, so it will be beneficial to the grid to increase the rate of increment.

During lower frequency crisis, the limits of the physical variable of the load are decremented, until they reach a minimum energy state (y=0). The rate of decrement is chosen to be approximately half the on running time of the load, so some response will remain as the limits are reduced towards zero.

During low frequency stress, the current limits of the load, as defined by the set point of the load, are frozen so as to prevent adjustment of the set point by the user. The exception to this freezing of the limits is in the case of recovery from low frequency crisis, during which time the limits are incremented to bring them back towards their value before the crisis state was entered.

Once the normal mode of operation after BSA has been reached, the limits of the sensed physical variable are preferably controlled depending upon whether the grid is facing high frequency stress or crisis or low frequency stress or crisis. During high frequency stress or crisis, off devices are preferably turned on in order to take up the excess generation. Thus, the value of ymax is preferably increased such that on devices will remain on for a longer period of time and previously off devices that have just been switched on because of the high frequency remain on for an extended period of time as well. During a low frequency stress or crisis, the opposite is true, and there is too much load on the grid. This means that the lower limit of the sensed physical variable (ymin) is decreased to ensure off devices remain off for an extra amount of time.

During high frequency crisis, the limits are incremented until they reach a maximum energy store level (y=1). The increments are chosen to approximately double the on portion of the duty cycle of the load, so as to reduce the energy store level, but still maintain some response.

During high frequency stress, the minimum and maximum limits for the sensed physical variable are frozen for the same reason that they are frozen during a period of low frequency stress—to prevent set point adjustment. An exception to these limits being prevented from being changed occurs when the grid is in recovery from high or low frequency crisis, when the limits are moved in small steps until they have become those used before the grid entered a crisis state.

The increment of the limits during high frequency crisis or black start assistance mode of operation of the grid responsive control device and the decrement of the limits during low frequency crisis are illustrative of another novel and advantageous feature of the present invention over the prior art. According to the present invention, even during such rare grid events, some grid response behavior is still given. This response is particularly beneficial during these grid states if grid stability is to be recovered.

The dashed lines in FIG. 4 show illegal transitions which represent strange behavior of the grid. For example moving directly from a low frequency crisis state to a high frequency crisis state should not occur. In general if such a transition does happen, an intermediate state is chosen by the control device to make the state transition of the grid responsive control device less abrupt.

While the minimum and maximum limits of the sensed variable are changed depending upon the mode of operation of the device, the determination of the trigger frequency is as previously described. The only difference being that the average temperature level in a population of such devices will be extended over a larger temperature range depending on the mode of operation. Thus, in a crisis mode, the load's variable limit (ymin or ymax) will be extended as compared to the limits during normal operation. This will result in the population of the devices providing response over an extended range of the physical variable of the load.

With reference to FIG. 5, once the device has started-up in black start mode and once the grid status has been determined, the target and trigger frequencies will be calculated using the adjusted ymax and/or ymin, which are adjusted depending on the grid status, and the current value of the physical variable of the load, as sensed. Having sensed the grid frequency and the physical variable of the load and having obtained a value of the sensed frequency to trigger the load on or off, a decision can be as to whether to switch the device. This decision is made by comparing the sensed frequency to the trigger frequency and by comparing the sensed variable of the load to the current limits for the load's sensed variable.

Further steps are also shown in FIG. 5. These steps involve capturing data concerning device operation and using this data to tune the operation of the device. This capturing and tuning has already been discussed above with respect to the provision of the grid frequency limits and their adjustment depending upon experience of the grid. Further possibilities for tuning the device are discussed below. The tuned variables could potentially be stored and re-used advantageously.

FIG. 5 also shows the possibility of communicating data captured and this is discussed below.

The present invention also encompasses a grid responsive control device as discussed above with certain modifications. These modifications are optional features that may offer particular improvements to the control device already discussed.

The control device of the present invention aims to prevent rapid switching of the energy store loads, but there may still be certain grid conditions that result in an excessive switching rate, particularly when the grid is under stress. Such rapid switching rates may, in the case of a refrigerator for example, make its compressor ineffective as well as damaging it. The ineffectiveness of the compressor may result from a minimum time needed for internal pressure in the compressor to dissipate after being switched off. If it is switched on again before this has happened, the high pressure in the compressor cannot be overcome (it needs an extra push from the inertia of a running pump), so it will stall. This can create a high electrical load, dissipated as heat, putting the whole device at risk. Refrigerators usually have stall or thermal detectors which disconnect power and so protect the device from this damage.

The responsive control device of the present invention may include a hysterisis feature, such that an on or off state is maintained for a minimum period, and this can be set to suit the device. This hysterisis feature is a backup, as the trigger frequency trajectory being biased to minimize switching should normally prevent any rapid switching. It will only be in the most extreme grid conditions that the switching rate will become excessive and the hysterisis feature is required.

The grid responsive control device of the present invention should be capable of operating without any external input, apart from the frequency and the sensed variable. The grid responsive control device should also be autonomous over the whole life of the energy store.

In order to achieve such autonomy requirements, the grid responsive control device of the present invention is preferably adapted to detect the nominal frequency (and this step is shown in FIG. 5) of the grid itself. As described above, it is important for the present invention to be aware of the nominal frequency so that the control device can bias its grid response behavior so as to urge the system frequency towards the nominal frequency.

There are other grid particular settings which the present invention makes use of, and which, the grid responsive control device should be able to ascertain from experience of the grid to which it is connected and not from additional inputs. One other example is the detection of the upper and lower frequency limits, as described above.

In view of the above requirements of the present invention, the grid responsive control device is adapted to determine the nominal frequency after taking a series of measurements. For each of these measurements, a set of "standard nominal frequencies" stored in a memory of the control device are interrogated and the closest standard nominal frequency to the grid frequency measurement is taken as the standard frequency for that measurement. Once the same standard frequency has been determined from a consecutive number of frequency measurements, the value determined is chosen as the nominal frequency of the grid. The responsive control of the present invention is, therefore, required to keep a list of possible normal frequencies, such as 50 hertz, 60 hertz and 400 hertz.

The control device of the present invention may also be configured to be aware of certain pre-established periods of time, which are employed in saving any current settings learned from the grid. Any of these grid experience determined parameters can be saved in long term non-volatile memory at the end of an appropriate time period. In this way, key features of the grid behavior can be recorded onto long term memory.

The ability to store data and update this data as the device learns from the grid's behavior and the load's behavior is an important feature of the present invention (and is shown In FIG. 5) as it is very possible that a particular load could be moved between grids. For example, in Denmark the load will not even need to be moved internationally to change grids. Each grid will behave differently and the grid responsive control device will need to react to this and adapt accordingly.

The control device will also need to tune itself to the grid's behavior because it is possible that this behavior could change with time, particularly as more and more of the grid responsive control devices are applied to the energy store loads on the grid. The self-tuning, however, needs to be performed carefully as it would not be helpful if, for example, a sustained period of grid instability caused self-tuning that damaged the device's ability to respond during a rare crisis.

The responsive control devices may also need to tune their parameters to take into account the behavior of the load. For example, a very full refrigerator does not behave in quite the same way as a nearly empty one.

The possibilities for self-tuning are presently envisaged to include optimization taking account of variation in the expected duty cycle time, optimization of the maximum and minimum frequency limits in light of grid experience (as discussed above) and optimizing the use of historical frequency behaviors within the adaptation parameters.

If a load is recovering from a blackout, it will be desirable to retain any tuned parameters achieved before the blackout. This requires storing of the tuned parameters and other captured data, as shown in FIG. 5. The control device, however, also needs to take into account that the device could be being switched on for the very first time and there are not any previously tuned parameters to recover. The general principle to which the grid responsive control devices will be operated is that the device will aim to recover earlier tuning, unless the device has been disconnected for so long that it cannot be a blackout, or the grid nominal frequency has changed.

A hardware feature could be used to determine whether the device has been disconnected for longer than a blackout, such as a leaky capacitor, which, when this is discharged, suggests the load is in a y=0 state.

Thus, the controller is provided with some means of determining whether the load was switched off because of a blackout or simply because the user had switched it off. In both cases, recovery of previously tuned parameters is appropriate. If, however, the load is being switched on for the first time, or is likely to have been moved between grids, then, loading of previously determined parameters from memory will not be performed.

Recovery from a blackout also realizes the possibility of all of the data capture periods of a population of the loads connected to the grid becoming synchronized. None of the currently envisaged processes depends critically upon diversified periods, but the possibility of rapid change in grid behavior from simultaneous identical self-tuning is removed if they are. Thus, upon initial switch on, the grid responsive control devices of the present invention are preferably adapted to choose a random time for any periods that the device makes use of.

The responsive control device of the present invention often makes use of the time which the device is expected to be on, and the time which the device is expected to be off, for example in determining the rate of increment or decrement of the sensed variable control limits during black start assistance or high or low crisis operation. The time the device is expected to be on or off is the time the load is expected to take in moving from one sensed variable value to another. Tuning of this expectation time is possible based on experience of how the sensed variable of the load reacts to a particular energy consumption level.

One way of optimizing the load's response to energy consumption is as follows. After each change of state, i.e. switching from an on status to an off status or vice visa, it is possible to note how long the load has run, and the extent of change of the sensed variable in that time. For estimating an expected on time or off time for a particular variable change, these noted values can be extrapolated. How the sensed variable will change with on/off time depends upon its current use, e.g. how full it is and how often it has been opened. The expected on or off time calculations could be performed at each switching point, for example.

The responsive control device may also make use of a prediction of how long it will be in an on state or an off state. This can be determined from a moving average of the actual times of previous states.

It is clear from inspection of frequency charts that different grids have real differences in their frequency behavior. The range over which the frequency varies is one important aspect, but there are also more subtle differences such as its tendency to fluctuate, the usual length of excursions above nominal, etc. It is possible that these features can be used to modify some of the parameters, such as the parameters adjusting the rate at which frequency limits narrow. Thus it is important for the responsive control device of the present invention to capture information on the behavior of the grid frequency, particularly at the end of natural periods, such as a frequency excursion, and of a particular grid state (normal, stressed, or crisis), the end of particular state of the load (on or off) or the end of an operation cycle (one cycle of the processor controlling the timings of the major functions of the control device). All of the information captured could be used for the input in tuning the responsive control device so as to optimize operation with respect to the grid to which it is connected.

The responsive control device of the present invention may also include some form of communication means, and a communication step is shown in FIG. 5, so that the data collected can be transferred. The transference of data will normally be provided by maintenance personnel. The communication means may also be available such that the software of the responsive control device or the grid parameters may be updated upon a maintenance visit. The communication means will also make it possible to capture measurements of the grid behavior during the working life of the load and also the loads contribution to the grid. Thus, some measure of load's value to the grid can be determined.

The invention claimed is:

1. A control device for controlling an energy consumption of a load on an electricity grid, said control device comprising:
    means for sensing over a period of time values of a physical variable of the grid, said physical variable varying in dependence on a relationship between electricity generation and load on the grid;
    means for determining a floating central value of the physical variable of the grid using a plurality of former values of the physical variable of the grid; and
    means for varying the energy consumption of said load, said varying being dependent upon a recent value of the physical variable of the grid relative to said floating central value.

2. The control device of claim 1, further comprising:
    means for varying the energy consumption of said load when a current value of said sensed physical variable of the grid reaches a trigger value; and
    means for determining said trigger value.

3. The control device of claim 2, wherein said means for determining said trigger value comprises a function for randomly providing said trigger value.

4. The control device of claim 3, wherein said means for varying is configured to vary said energy consumption by switching the energy consumption between a first state of increasing the energy stored by the load and a second state of decreasing the energy stored by the load.

5. A method of controlling an energy consumption of a load on an electricity grid, said method comprising:
    sensing over a period of time values of a physical variable of the grid, said physical variable varying in dependence on a relationship between electricity generation and load on the grid;
    determining a floating central value of the physical variable of the grid using a plurality of former values of the physical variable of the grid; and
    varying the energy consumption of said load, said varying being dependent upon a recent value of the physical variable of the grid relative to said floating central value.

6. The method of claim 5, further comprising:
    varying the energy consumption of said load when a current value of said sensed physical variable of the grid reaches a trigger value.

7. The method of claim 6, further comprising determining said trigger value, said determining comprising a function for randomly providing said trigger value.

8. The method of claim 7, wherein said varying comprises varying said energy consumption by switching the energy consumption between a first state of increasing the energy stored by the load and a second state of decreasing the energy stored by the load.

* * * * *

UNITED STATES PATENT AND TRADEMARK OFFICE
CERTIFICATE OF CORRECTION

| | | |
|---|---|---|
| PATENT NO. | : 8,396,607 B2 | Page 1 of 1 |
| APPLICATION NO. | : 12/927892 | |
| DATED | : March 12, 2013 | |
| INVENTOR(S) | : David R. Hirst | |

It is certified that error appears in the above-identified patent and that said Letters Patent is hereby corrected as shown below:

Title page,
Item [63], Related U.S. Application Data, delete

"Continuation of application No. 11/921,362, filed as application No. PCT/EP2006/005252 on Jun. 1, 2006, now abandoned."

and substitute

-- Continuation of application No. 11/921,362, filed as application No. PCT/EP2006/005252 on Jun. 1, 2006. --

Signed and Sealed this
Thirtieth Day of April, 2013

Teresa Stanek Rea
*Acting Director of the United States Patent and Trademark Office*